(12) United States Patent
Kobayashi et al.

(10) Patent No.: US 12,447,981 B2
(45) Date of Patent: Oct. 21, 2025

(54) VEHICLE MANAGEMENT SYSTEM AND VEHICLE MANAGEMENT METHOD

(71) Applicant: TOYOTA JIDOSHA KABUSHIKI KAISHA, Toyota (JP)

(72) Inventors: Ryosuke Kobayashi, Nagakute (JP); Tomokazu Maya, Nagoya (JP); Tsuyoshi Okada, Nagoya (JP); Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 232 days.

(21) Appl. No.: 17/985,187

(22) Filed: Nov. 11, 2022

(65) Prior Publication Data

US 2023/0249700 A1 Aug. 10, 2023

(30) Foreign Application Priority Data

Feb. 10, 2022 (JP) .................. 2022-019536

(51) Int. Cl.
*B60W 50/029* (2012.01)
*B60W 50/02* (2012.01)
*B60W 60/00* (2020.01)

(52) U.S. Cl.
CPC ...... *B60W 50/029* (2013.01); *B60W 50/0205* (2013.01); *B60W 60/0015* (2020.02); *B60W 2050/021* (2013.01); *B60W 2050/0292* (2013.01); *B60W 2556/45* (2020.02)

(58) Field of Classification Search
CPC .... B60W 50/00; B60W 50/02; B60W 50/029; B60W 50/0205; B60W 60/00; B60W 60/001; B60W 60/005; B60W 60/0015; B60W 60/0051; B60W 60/0053; B60W 2050/021; B60W 2050/0292; B60W 2050/0295; B60W 2556/00; B60W 2556/45; G07C 5/00; G07C 5/08; G07C 5/0816; H04L 67/00; H04L 67/01; H04L 67/12
USPC ........................................ 701/292
See application file for complete search history.

(56) References Cited

U.S. PATENT DOCUMENTS

| | | | |
|---|---|---|---|
| 2020/0079394 A1* | 3/2020 | Masuda | B60R 21/00 |
| 2021/0114600 A1* | 4/2021 | Uno | G06V 20/52 |
| 2023/0176183 A1* | 6/2023 | Sanberg | G01S 13/89 |
| | | | 701/31.4 |

(Continued)

FOREIGN PATENT DOCUMENTS

| | | | |
|---|---|---|---|
| JP | 2019-083017 A | 5/2019 | |
| JP | 2020-003935 A | 1/2020 | |

(Continued)

*Primary Examiner* — Khoi H Tran
*Assistant Examiner* — Sarah A Tran
(74) *Attorney, Agent, or Firm* — Dinsmore & Shohl LLP

(57) ABSTRACT

A vehicle management system includes a signal transmission device and a management device configured to manage a vehicle. The signal transmission device is configured to transmit an abnormality signal for notifying of an abnormality of the vehicle to the management device in a case where a predetermined operation is executed for the signal transmission device in the vehicle during autonomous driving without presence of a manager. The signal transmission device may be mounted on a vehicle or a mobile terminal.

18 Claims, 12 Drawing Sheets

(56) References Cited

U.S. PATENT DOCUMENTS

| | | | |
|---|---|---|---|
| 2023/0182770 A1* | 6/2023 | Yanagisawa | B60W 30/12 701/23 |
| 2023/0282043 A1* | 9/2023 | Brunda | G07C 5/0816 701/31.4 |

FOREIGN PATENT DOCUMENTS

| | | | |
|---|---|---|---|
| JP | 2020-126450 A | 8/2020 | |
| JP | 2020166760 A * | 10/2020 | G06Q 10/0637 |

* cited by examiner

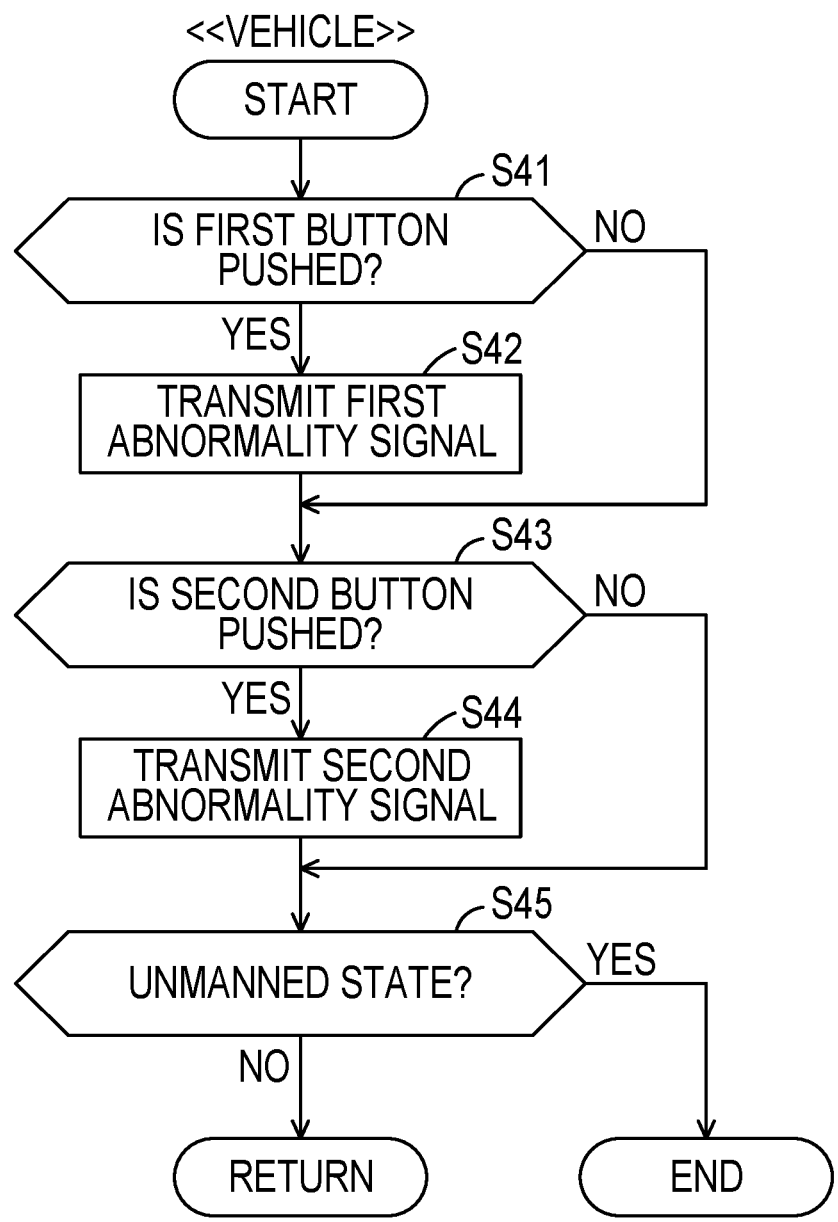

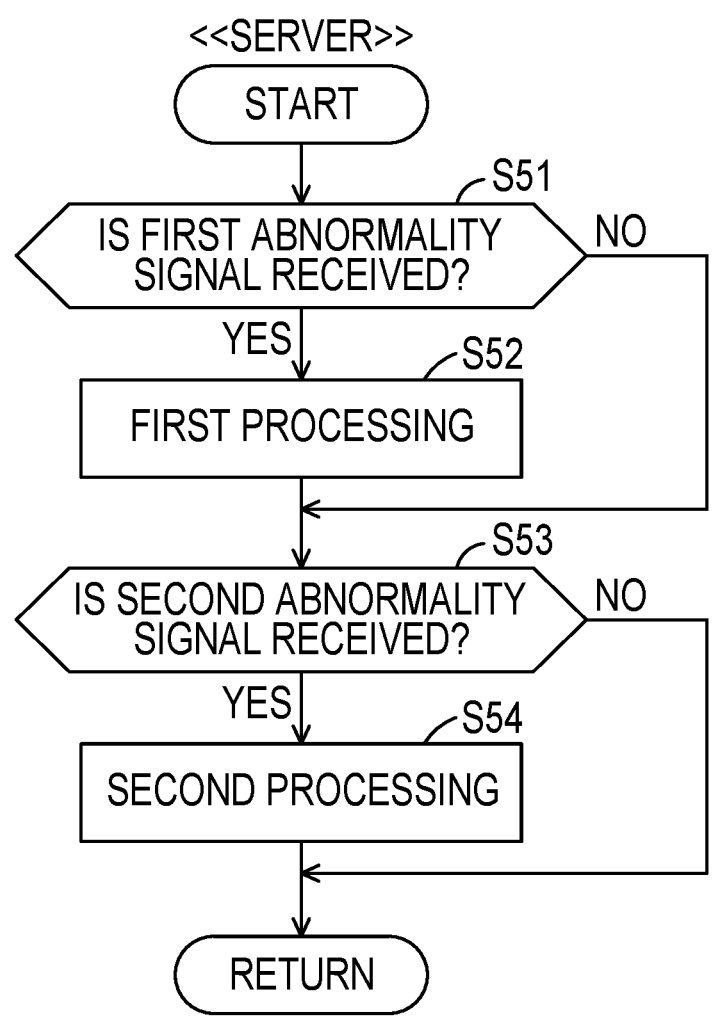

VEHICLE MANAGEMENT SYSTEM AND VEHICLE MANAGEMENT METHOD

CROSS-REFERENCE TO RELATED APPLICATION

This application claims priority to Japanese Patent Application No. 2022-019536 filed on Feb. 10, 2022, incorporated herein by reference in its entirety.

BACKGROUND

1. Technical Field

The present disclosure relates to a vehicle management system and a vehicle management method.

2. Description of Related Art

Japanese Unexamined Patent Application Publication No. 2020-166760 (JP 2020-166760 A) discloses a system that determines whether or not maintenance is needed for an autonomous driving vehicle, and reserves a schedule for maintenance work in a case where a determination is made that the maintenance is needed.

SUMMARY

In future, it is considered that, as an autonomous driving technique is improved, the number of autonomous driving vehicles that travel without the presence of a manager will be increased. Such an autonomous driving vehicle is expected to basically travel unmanned. It is considered that a person who checks a status of the autonomous driving vehicle up close will be a limited person, such as a service user (for example, a passenger who receives a passenger transportation service) or a worker who provides a service (for example, a worker who loads and unloads a package for a delivery service).

Since the autonomous driving vehicle travels without the presence of the manager, it is considered that any abnormality that has occurred in the autonomous driving vehicle will be discovered and coped with by regular maintenance (for example, inspection). However, in order to provide a high-quality service with the autonomous driving vehicle, it is needed to detect the abnormality at an earlier stage and cope with the abnormality. Frequent maintenance of the autonomous driving vehicle is also considered, but increasing the frequency of the maintenance of the autonomous driving vehicle will lead to a decrease in an operating rate of the autonomous driving vehicle, and thus there is a limit to increasing the frequency of the maintenance of the autonomous driving vehicle.

The present disclosure is to cope with an abnormality at an early stage in a case where the abnormality has occurred in a vehicle during autonomous driving without the presence of a manager.

A first aspect of the present disclosure relates to a vehicle management system including a signal transmission device, and a management device configured to manage a vehicle. The signal transmission device is configured to transmit an abnormality signal for notifying of an abnormality of the vehicle to the management device in a case where a predetermined operation is executed for the signal transmission device in the vehicle during autonomous driving without presence of a manager.

In the vehicle management system described above, the abnormality signal for notifying of the abnormality of the vehicle is transmitted from the signal transmission device to the management device in a case where the predetermined operation is executed for the signal transmission device in the vehicle during autonomous driving without the presence of the manager. For example, by executing the predetermined operation for the signal transmission device the service user who has discovered the abnormality in the vehicle or a worker who provides the service, the abnormality signal is transmitted to the management device. A vehicle manager can grasp at an early stage that the abnormality has occurred in the vehicle. As a result, in a case where the abnormality has occurred in the vehicle during autonomous driving without the presence of the manager, it is possible to cope with the abnormality at an early stage.

The signal transmission device may be mounted on a mobile terminal. With such a configuration, the signal transmission device described above can be suitably realized by the mobile terminal. The abnormality signal may be transmitted to the management device in a case where the mobile terminal is operated in the vehicle during autonomous driving without the presence of the manager. The mobile terminal may include a touch panel display that can be operated by the user.

Alternatively, the signal transmission device may be mounted on the vehicle. With such a configuration, in a case where the user operates the signal transmission device mounted on the vehicle during autonomous driving without the presence of the manager, the abnormality signal described above is transmitted to the management device. Since the vehicle has the function of the signal transmission device, the vehicle itself can transmit the abnormality signal described above.

The signal transmission device may be configured not to receive the predetermined operation in a case where the vehicle is present outside a predetermined area.

It is considered that the signal transmission device may be mischievously operated in a situation in which no abnormality has occurred in the vehicle. In a case where the abnormality signal is transmitted to the management device even though no abnormality has occurred in the vehicle, there is the probability that unneeded vehicle maintenance will be executed and the operating rate of the autonomous driving vehicle will be decreased. In the vehicle management system described above, in a case where the vehicle is present outside the predetermined area, the abnormality signal is transmitted when the predetermined operation is not executed for the signal transmission device. By setting an area in which the abnormality is likely to occur in the vehicle as the predetermined area described above, it is possible to achieve both early detection of the abnormality and a high operating rate of the autonomous driving vehicle.

The signal transmission device may be configured not to receive the predetermined operation outside a predetermined period.

In the vehicle management system described above, outside the predetermined period, the abnormality signal is not transmitted even in a case where the predetermined operation is executed for the signal transmission device. By setting a period in which the abnormality is likely to occur in the vehicle as the predetermined period described above, it is possible to achieve both early detection of the abnormality and a high operating rate of the autonomous driving vehicle. The predetermined period may be after a predetermined time has elapsed since the maintenance is executed for the vehicle.

The signal transmission device may be configured to receive a start operation. The signal transmission device may be configured to request input of a kind of the abnormality that has occurred in the vehicle in a case where the start operation is executed for the signal transmission device. The signal transmission device may be configured to transmit the abnormality signal indicating the kind of the abnormality to the management device in a case where the input of the kind of the abnormality is received.

With the configuration described above, the management device can grasp the kind of the abnormality. The vehicle manager can take appropriate measures in accordance with the kind of the abnormality. For example, the vehicle manager can cope with, at an early stage, the abnormality that should be coped with at an early stage, and cope with a minor abnormality that do not need to be coped with at an early stage through regular maintenance. With the configuration described above, it is possible to reduce a maintenance cost.

The management device may be configured to stop autonomous driving of the vehicle in a case where the kind of the abnormality indicated by the abnormality signal is a predetermined first kind. The management device may be configured to continue autonomous driving of the vehicle in a case where the kind of the abnormality indicated by the abnormality signal is a predetermined second kind.

With the configuration described above, autonomous driving of the vehicle is stopped in a case where the abnormality that has occurred in the vehicle belongs to the predetermined first kind (for example, an abnormality that hinders autonomous driving of the vehicle), and autonomous driving of the vehicle is continued in a case where the abnormality that has occurred in the vehicle belongs to the predetermined second kind (for example, an abnormality that does not hinder autonomous driving of the vehicle). Therefore, it is possible to suppress unneeded vehicle maintenance and the decrease in the operating rate of the autonomous driving vehicle.

The signal transmission device may have a call function. The management device may be configured to start a call between a predetermined terminal and the signal transmission device in a case where the kind of the abnormality indicated by the abnormality signal is unknown.

With the configuration described above, it is easier for the vehicle manager to check the details of the abnormality through the call between the person who has discovered the abnormality and the vehicle manager (for example, a person in charge belonging to a management business operator).

The signal transmission device may have a first button and a second button. The signal transmission device may be configured to transmit a first abnormality signal for notifying of the abnormality of the vehicle to the management device in a case where the first button is operated in the vehicle during autonomous driving without the presence of the manager. The signal transmission device may be configured to transmit a second abnormality signal for notifying of the abnormality of the vehicle to the management device in a case where the second button is operated in the vehicle during autonomous driving without the presence of the manager. The management device may be configured to execute predetermined first processing in a case where the first abnormality signal is received. The management device may be configured to execute predetermined second processing in a case where the second abnormality signal is received.

With the configuration described above, it is possible to easily notify the management device of the abnormality in the autonomous driving vehicle. Since the signal transmission device includes two buttons, at least two kinds of abnormalities can be distinguished and notified to the management device. The management device can execute appropriate processing in accordance with the kind of the abnormality.

A second aspect of the present disclosure relates to a vehicle management method including determining whether or not a predetermined operation is executed for a signal transmission device in a vehicle during autonomous driving without presence of a manager, and transmitting an abnormality signal for notifying of an abnormality of the vehicle to a management device configured to manage the vehicle via the signal transmission device in a case where the predetermined operation is executed for the signal transmission device.

With the vehicle management method described above, as with the vehicle management system described above, it is possible to cope with the abnormality at an early stage in a case where the abnormality has occurred in the vehicle during autonomous driving without the presence of the manager.

According to the present disclosure, in a case where the abnormality has occurred in the vehicle during autonomous driving without the presence of the manager, it is possible to cope with the abnormality at an early stage.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 13 is a flowchart showing processing executed by the signal transmission device shown in FIG. 12; and FIG. 14 is a flowchart showing processing executed by the management device (server) in response to first and second abnormality signals transmitted by the signal transmission device shown in FIG. 12.

DETAILED DESCRIPTION OF EMBODIMENTS

Figure 1:
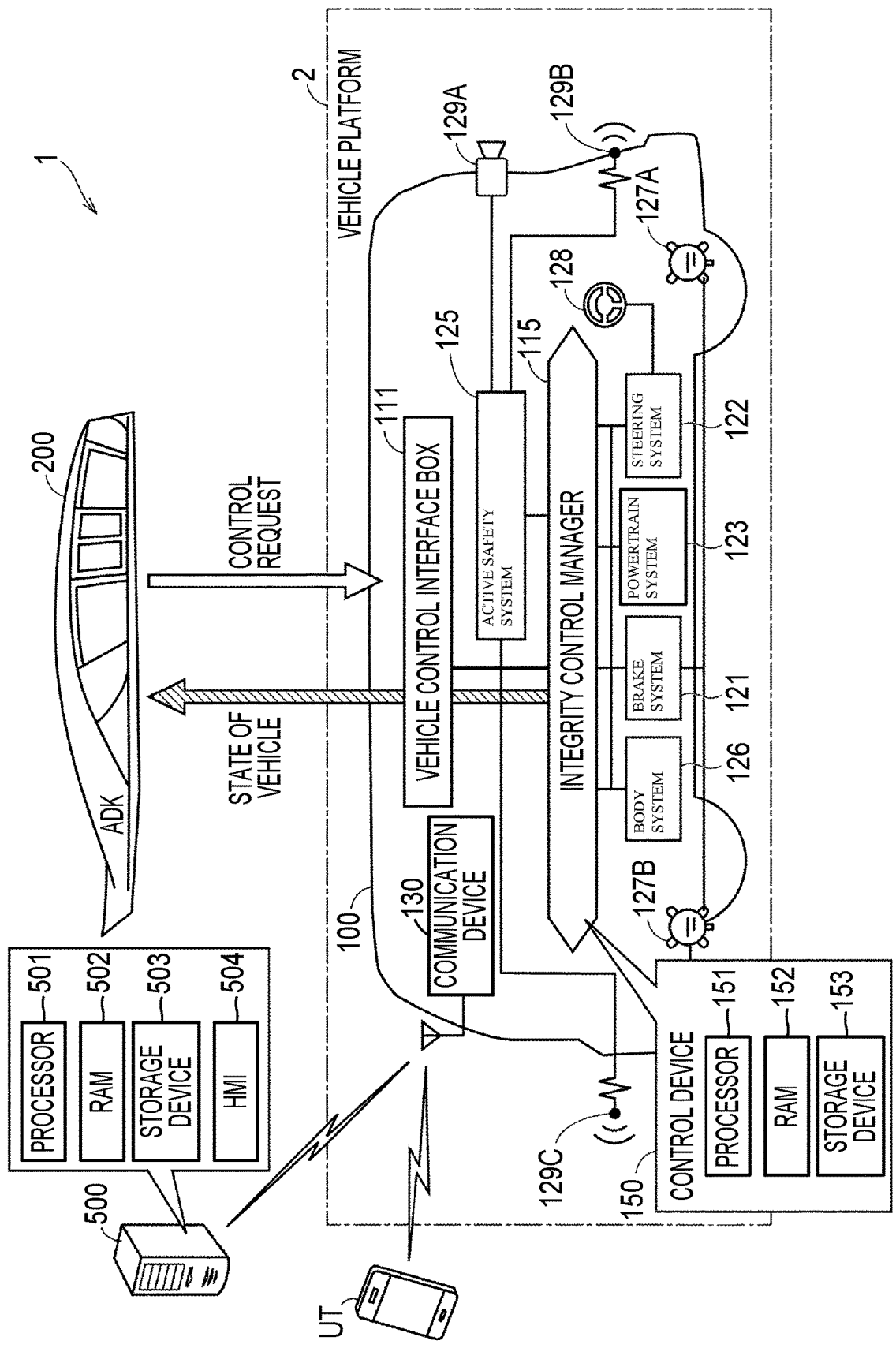
FIG. 1 is a diagram showing a schematic configuration of a vehicle according to an embodiment of the present disclosure.

In the following, an embodiment of the present disclosure will be described in detail with reference to the drawings. It should be noted that, in the drawings, the same or corresponding parts are designated by the same reference signs and the description thereof will not be repeated.

FIG. 1 is a diagram showing a schematic configuration of a vehicle according to the embodiment of the present disclosure. With reference to FIG. 1, a vehicle 1 includes an autonomous driving kit (hereinafter, referred to as "ADK") 200 and a vehicle platform (hereinafter, referred to as "VP") 2.

The VP 2 includes a control system of a base vehicle 100 and a vehicle control interface box (hereinafter, referred to as "VCIB") 111 provided in the base vehicle 100. The VCIB 111 may communicate with the ADK 200 via an in-vehicle network, such as a controller area network (CAN). It should be noted that, although the base vehicle 100 and the ADK 200 are shown at separate positions in FIG. 1, the ADK 200 is actually attached to the base vehicle 100. In the present embodiment, the ADK 200 is attached to a rooftop of the base vehicle 100. It should be noted that an attachment position of the ADK 200 can be changed as appropriate.

The base vehicle 100 is, for example, a commercially available electrified vehicle (xEV). The xEV is a vehicle that uses electric power as all or part of a power source. In the present embodiment, a battery electric vehicle (BEV) is adopted as the base vehicle 100. It should be noted that the present disclosure is not limited to this, and the base vehicle 100 may be an xEV (REV, PHEV, FCEV, or the like) other than the BEV. The number of wheels provided in the base vehicle 100 is, for example, four. It should be noted that the number of wheels provided in the base vehicle 100 is not limited to this, and may be three or five or more.

The control system of the base vehicle 100 includes, in addition to an integrity control manager 115, various systems and various sensors for controlling the base vehicle 100. The integrity control manager 115 controls various systems related to the operation of the base vehicle 100 in an integrated manner based on signals (sensor detection signals) from various sensors provided in the base vehicle 100.

In the present embodiment, the integrity control manager 115 includes a control device 150. The control device 150 includes a processor 151, a random access memory (RAM) 152, and a storage device 153. As the processor 151, for example, a central processing unit (CPU) can be adopted. The RAM 152 functions as a working memory that transitorily stores the data processed by the processor 151. The storage device 153 is configured to store the stored information. For example, the storage device 153 includes a read only memory (ROM) and a rewritable non-volatile memory. The storage device 153 stores information used in a program (for example, a map, a mathematical formula, and various parameters), in addition to the program. In the present embodiment, the processor 151 executes the program stored in the storage device 153 to execute various vehicle controls (for example, autonomous driving control in response to an instruction from the ADK 200). It should be noted that these pieces of processing may be executed by dedicated hardware (electronic circuit) instead of software. It should be noted that the number of processors provided in the control device 150 is optional, and the processor may be prepared for each predetermined control.

The base vehicle 100 includes a brake system 121, a steering system 122, a powertrain system 123, an active safety system 125, and a body system 126. These systems are controlled in an integrated manner by the integrity control manager 115. In the present embodiment, each system includes the computer. Moreover, the computer for each system communicates with the integrity control manager 115 via the in-vehicle network (for example, the CAN). In the following, the computer provided in each system is referred to as an "electronic control unit (ECU)".

The brake system 121 includes a braking device provided in each wheel of the base vehicle 100, and an ECU that controls the braking device. In the present embodiment, a hydraulic disc brake device is adopted as the braking device. The base vehicle 100 includes wheel speed sensors 127A, 127B. The wheel speed sensors 127A are provided in front wheels of the base vehicle 100 and detect the rotation speed of the front wheels. The wheel speed sensors 127B are provided in rear wheels of the base vehicle 100 and detect the rotation speed of the rear wheels. The ECU of the brake system 121 outputs a rotation direction and the rotation speed of each wheel detected by the wheel speed sensors 127A, 127B to the integrity control manager 115.

The steering system 122 includes a steering device of the base vehicle 100, and an ECU that controls the steering device. The steering device includes, for example, a rack and pinion type electric power steering (EPS) in which a steering angle can be adjusted by an actuator. The base vehicle 100 includes a pinion angle sensor 128. The pinion angle sensor 128 detects a rotation angle (pinion angle) of a pinion gear coupled to a rotation shaft of the actuator constituting the steering device. The ECU of the steering system 122 outputs the pinion angle detected by the pinion angle sensor 128 to the integrity control manager 115.

The powertrain system 123 includes an electric parking brake (EPB) provided in at least one of the wheels provided in the base vehicle 100, a P-Lock device provided in a transmission of the base vehicle 100, a shift device configured to select a shift range, a drive source of the base vehicle 100, and an ECU that controls each device provided in the powertrain system 123. The EPB is provided separately from the braking device described above, and puts the wheels into a fixed state by an electric actuator. For example, the P-Lock device puts a rotation position of an output shaft of the transmission into the fixed state by a parking lock pole that can be driven by the actuator. In the present embodiment, a motor that receives electric power supplied from a battery is adopted as the drive source of the base vehicle 100. The ECU of the powertrain system 123 outputs, to the integrity control manager 115, the presence or absence of fixation by each of the EPB and the P-Lock device, the shift range selected by the shift device, and a state of each of the battery and the motor.

The active safety system 125 includes an ECU that determines the probability of collision with respect to the traveling vehicle 1. The base vehicle 100 includes a camera 129A and radar sensors 129B, 129C that detect peripheral situations including the front and rear of the vehicle 1. The ECU of the active safety system 125 determines whether or not there is the probability of collision by using the signals received from the camera 129A and the radar sensors 129B, 129C. In a case where the active safety system 125 determines that there is the probability of collision, the integrity control manager 115 outputs a braking command to the brake system 121 to increase a braking force of the vehicle 1. The base vehicle 100 according to the present embodiment includes the active safety system 125 from an initial stage (at the time of shipment). However, the present disclosure is not limited to this, and an active safety system that can be retrofitted to the base vehicle may be adopted.

The body system 126 includes body system components (for example, turn signals, a horn, a door, and a windshield wiper), and an ECU that controls the body system components. The ECU of the body system 126 controls the body system components in response to a user operation in a manual mode, controls the body system components in response to the command received from the ADK 200 via the VCIB 111 and the integrity control manager 115 in an autonomous mode.

The vehicle 1 is configured to execute autonomous driving. The VCIB 111 functions as a vehicle control interface. In a case where the vehicle 1 travels by autonomous driving, the integrity control manager 115 and the ADK 200 exchange signals with each other via the VCIB 111, and the integrity control manager 115 executes traveling control (that is, autonomous driving control) by the autonomous mode in response to the command from the ADK 200. It should be noted that the ADK 200 can also be removed from the base vehicle 100. The base vehicle 100 can travel as a single base vehicle 100 by the user's driving even in a state in which the ADK 200 is removed. In a case where the base vehicle 100 travels as a single base vehicle 100, the control system of the base vehicle 100 executes the traveling control in the manual mode (that is, traveling control in response to the user operation).

In the present embodiment, the ADK 200 exchanges signals with the VCIB 111 in accordance with an application program interface (API) that defines each signal to be communicated. The ADK 200 is configured to process various signals defined by the API described above. For example, the ADK 200 creates a traveling plan of the vehicle 1 and outputs various commands requesting control to cause the vehicle 1 to travel in accordance with the created traveling plan to the VCIB 111 in accordance with the API described above. In the following, each of the various commands described above output from the ADK 200 to the VCIB 111 is also referred to as an "API command". In addition, the ADK 200 receives various signals indicating a state of the base vehicle 100 from the VCIB 111 in accordance with the API, and reflects the received state of the base vehicle 100 in the creation of the traveling plan. In the following, each of the various signals received by the ADK 200 from the VCIB 111 is also referred to as an "API signal". Both the API command and the API signal correspond to the signals defined in the API described above. Details of the configuration of the ADK 200 will be described below (see FIG. 2).

The VCIB 111 receives various API commands from the ADK 200. In a case where the API command is received from the ADK 200, the VCIB 111 converts the API command into a signal format that can be processed by the integrity control manager 115. In the following, the API command converted into the signal format that can be processed by the integrity control manager 115 is also referred to as "control command". In a case where the API command is received from the ADK 200, the VCIB 111 outputs the control command corresponding to the API command to the integrity control manager 115.

The control device 150 of the integrity control manager 115 transmits various signals (for example, a sensor signal or a status signal) indicating the state of the base vehicle 100 detected in the control system of the base vehicle 100 to the ADK 200 via the VCIB 111. The VCIB 111 sequentially receives the signals indicating the state of the base vehicle 100 from the integrity control manager 115. The VCIB 111 decides a value of the API signal based on the signals received from the integrity control manager 115. In addition, the VCIB 111 also converts the signal received from the integrity control manager 115 into an API signal format, as needed. Moreover, the VCIB 111 outputs the obtained API signal to the ADK 200. The API signal indicating the state of the base vehicle 100 is sequentially output from the VCIB 111 to the ADK 200 in real time.

In the present embodiment, a less versatile signal defined by, for example, an automobile manufacturer is exchanged between the integrity control manager 115 and the VCIB 111, and a more versatile signal (for example, a signal defined by an open API) is exchanged between the ADK 200 and the VCIB 111. The VCIB 111 converts the signals between the ADK 200 and the integrity control manager 115 to allow the integrity control manager 115 to execute the vehicle control in response to the command from the ADK 200. It should be noted that the function of the VCIB 111 is not limited to the function of converting the signals described above. For example, the VCIB 111 may make a predetermined determination and transmit signals based on the determination result (for example, signals for notification, instruction, and request) to at least one of the integrity control manager 115 and the ADK 200. Details of the configuration of the VCIB 111 will be described below (see FIG. 2).

The base vehicle 100 further includes a communication device 130. The communication device 130 includes various communication interfaces (I/Fs). The control device 150 is configured to execute communication with an external device of the vehicle 1 (for example, a mobile terminal UT and a server 500 described below) via the communication device 130. The communication device 130 includes a wireless communicator (for example, a data communication module (DCM)) that can access a mobile communication network (telematics). The communication device 130 communicates with the server 500 via the mobile communication network. The wireless communicator may include a communication I/F compatible with fifth-generation mobile communication system (5G). In addition, the communication device 130 includes a communication I/F for directly communicating with the mobile terminal UT present in the vehicle or in a range around the vehicle. The communication device 130 and the mobile terminal UT may execute short-range communication, such as wireless local area network (LAN), near field communication (NFC), or Bluetooth (registered trademark).

The mobile terminal UT is a terminal carried by the user who uses the vehicle 1. The mobile terminal UT includes a built-in computer and functions as a "signal transmission device" according to the present disclosure. In the present embodiment, a smartphone equipped with a touch panel display and a camera is adopted as the mobile terminal UT. The smartphone has a call function. It should be noted that the present disclosure is not limited to this, any mobile terminal can be adopted as the mobile terminal UT, and a laptop, a tablet terminal, a wearable device (for example, a smartwatch or smart glasses), an electronic key, or the like can also be adopted.

The vehicle 1 can be adopted as one of the components of a mobility-as-a-service (MaaS) system. The MaaS system includes, for example, a mobility service platform (MSPF). The MSPF is a unified platform to which various mobility services (for example, various mobility services provided by a ride sharing business operator, a car sharing business operator, an insurance company, a car rental business operator, a taxi business operator, and the like) are connected. The server 500 is a computer that manages and opens information for the mobility services in the MSPF. The server 500 manages various types of mobility information, and provides information (for example, the API and information on cooperation between mobility) in response to a request from the business operator. The business operator that provides the service can use various functions provided by the MSPF by using the API open on the MSPF. For example, the API needed for the development of the ADK is open on the MSPF.

The server 500 includes a processor 501, a RAM 502, a storage device 503, and a human machine interface (HMI) 504. The storage device 503 is configured to store the stored information. The storage device 503 stores information used in a program (for example, a map, a mathematical formula, and various parameters), in addition to the program. A human machine interface (HMI) 504 includes an input device and a display device. The HMI 504 may be a touch panel display. The HMI 504 may include a smart speaker that receives a voice input.

Figure 2:
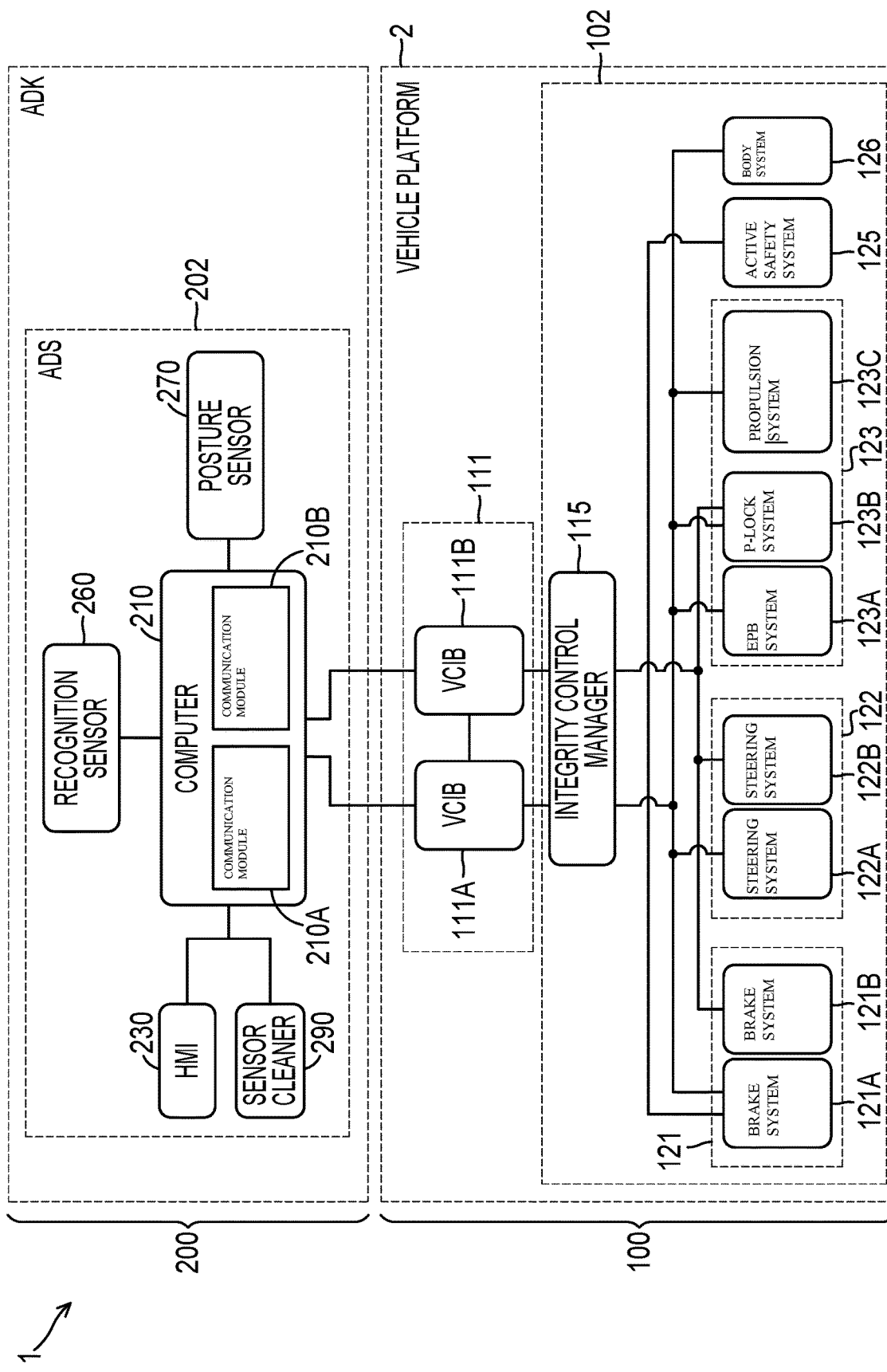
FIG. 2 is a diagram showing details of a control system of the vehicle shown in FIG. 1.

FIG. 2 is a diagram showing details of the control system of the vehicle 1. With reference to FIG. 2 together with FIG. 1, the ADK 200 includes an autonomous driving system (hereinafter, referred to as "ADS") 202 for executing autonomous driving of the vehicle 1. The ADS 202 includes a computer 210, a human machine interface (HMI) 230, a recognition sensor 260, a posture sensor 270, and a sensor cleaner 290.

The computer 210 includes a processor and a storage device that stores autonomous driving software using the API, and is configured to execute the autonomous driving software by the processor. The autonomous driving software executes control related to autonomous driving (see FIG. 3 described below). The autonomous driving software may be updated sequentially by over the air (OTA). The computer 210 further includes communication modules 210A, 210B.

The HMI 230 is a device for exchanging information between the user and the computer 210. The HMI 230 includes an input device and a notification device. Through the HMI 230, the user can make an instruction or a request to the computer 210 or change a value of a parameter used in the autonomous driving software (it should be noted that the change is limited to a parameter that is allowed to be changed). The HMI 230 may be a touch panel display having both functions of the input device and the notification device.

The recognition sensor 260 includes various sensors that acquire information for recognizing an external environment of the vehicle 1 (hereinafter, also referred to as "environmental information"). The recognition sensor 260 acquires the environmental information of the vehicle 1 and outputs the acquired environmental information to the computer 210. The environmental information is used for the autonomous driving control. In the present embodiment, the recognition sensor 260 includes a camera that images the surroundings (including the front and rear) of the vehicle 1 and an obstacle detector (for example, a millimeter wave radar and/or a LiDAR) that detects an obstacle by electromagnetic waves or sound waves. For example, the computer 210 can recognize a person present in a range that can be recognized by the vehicle 1, an object (other vehicles, a pillar, a guardrail, or the like), and a line on a road (for example, a center line) by using the environmental information received from the recognition sensor 260. Artificial intelligence (AI) or an image processing processor may be used for recognition.

The posture sensor 270 acquires information related to a posture of the vehicle 1 (hereinafter, also referred to as "posture information") and outputs the acquired information to the computer 210. The posture sensor 270 includes various sensors that detect the acceleration, the angular velocity, and the position of the vehicle 1. In the present embodiment, the posture sensor 270 includes an inertial measurement unit (IMU) and a global positioning system (GPS) sensor. The IMU detects the acceleration of each of a front-rear direction, a right-left direction, and an up-down direction of the vehicle 1, and the angular velocity of each of a roll direction, a pitch direction, and a yaw direction of the vehicle 1. The GPS sensor detects the position of the vehicle 1 by using signals received from a plurality of GPS satellites. A technique of measuring the posture with high accuracy by combining the IMU and the GPS is known in a field of an automobile and an aircraft. The computer 210 may measure the posture of the vehicle 1 from the posture information described above by using, for example, such a known technique.

The sensor cleaner 290 is a device that removes dirt from the sensor (for example, the recognition sensor 260) that is exposed to the outside air outside the vehicle. For example, the sensor cleaner 290 may be configured to use a cleaning solution and the windshield wiper to clean a lens of the camera and an exit of the obstacle detector.

In the vehicle 1, in order to improve the safety, predetermined functions (for example, braking, steering, and vehicle fixing) are provided with redundancy. A control system 102 of the base vehicle 100 includes a plurality of systems that realizes equivalent functions. Specifically, the brake system 121 includes brake systems 121A, 121B. The steering system 122 includes steering systems 122A, 122B. The powertrain system 123 includes an EPB system 123A and a P-Lock system 123B. Each system includes an ECU. Even in a case where the abnormality occurs in one of the systems that realize the equivalent functions, the other of the systems is operated normally, so that the function works normally in the vehicle 1.

The VCIB 111 includes a VCIB 111A and a VCIB 111B. Each of the VCIBs 111A, 111B includes a computer. The communication modules 210A, 210B of the computer 210 are configured to communicate with the computers of the VCIBs 111A, 111B, respectively. The VCIB 111A and the VCIB 111B are connected to each other to be communicable with each other. Each of the VCIBs 111A, 111B can be operated independently, and even in a case where the abnormality occurs in one of the VCIBs 111A, 111B, the other of the VCIBs 111A, 111B is operated normally, so that the VCIB 111 is operated normally. Both the VCIBs 111A, 111B are connected to each of the systems described above via the integrity control manager 115. It should be noted that, as shown in FIG. 2, connection destinations of the VCIB 111A and the VCIB 111B are partially different.

In the present embodiment, a function of accelerating the vehicle 1 is not provided with redundancy. The powertrain system 123 includes a propulsion system 123C as a system for accelerating the vehicle 1.

The vehicle 1 is configured to switch between the autonomous mode and the manual mode. The API signal received by the ADK 200 from the VCIB 111 includes a signal indicating whether the vehicle 1 is in the autonomous mode or the manual mode (hereinafter, referred to as "autonomous state"). The user can select any of the autonomous mode and the manual mode through a predetermined input device (for example, the HMI 230 or the mobile terminal UT). In a case where any of the driving modes is selected by the user, the vehicle 1 is set to the selected driving mode, and the selection result is reflected in the autonomous state. It should be noted that, in a case where the vehicle 1 is not in a state in which autonomous driving can be executed, the driving mode does not shift to the autonomous mode even when the user selects the autonomous mode. Switching of the driving modes of the vehicle 1 may be executed by the integrity control manager 115. The integrity control manager 115 may switch between the autonomous mode and the manual mode in accordance with the instruction from the server 500.

In a case where the vehicle 1 is in the autonomous mode, the computer 210 acquires a state of the vehicle 1 from the VP 2 and sets a next operation of the vehicle 1 (for example, acceleration, deceleration, and turning). Moreover, the computer 210 outputs various commands for realizing the next set operation of the vehicle 1. In a case where the computer 210 executes the API software (that is, the autonomous driving software using the API), the command related to the autonomous driving control is transmitted from the ADK 200 to the integrity control manager 115 through the VCIB 111.

Figure 3:
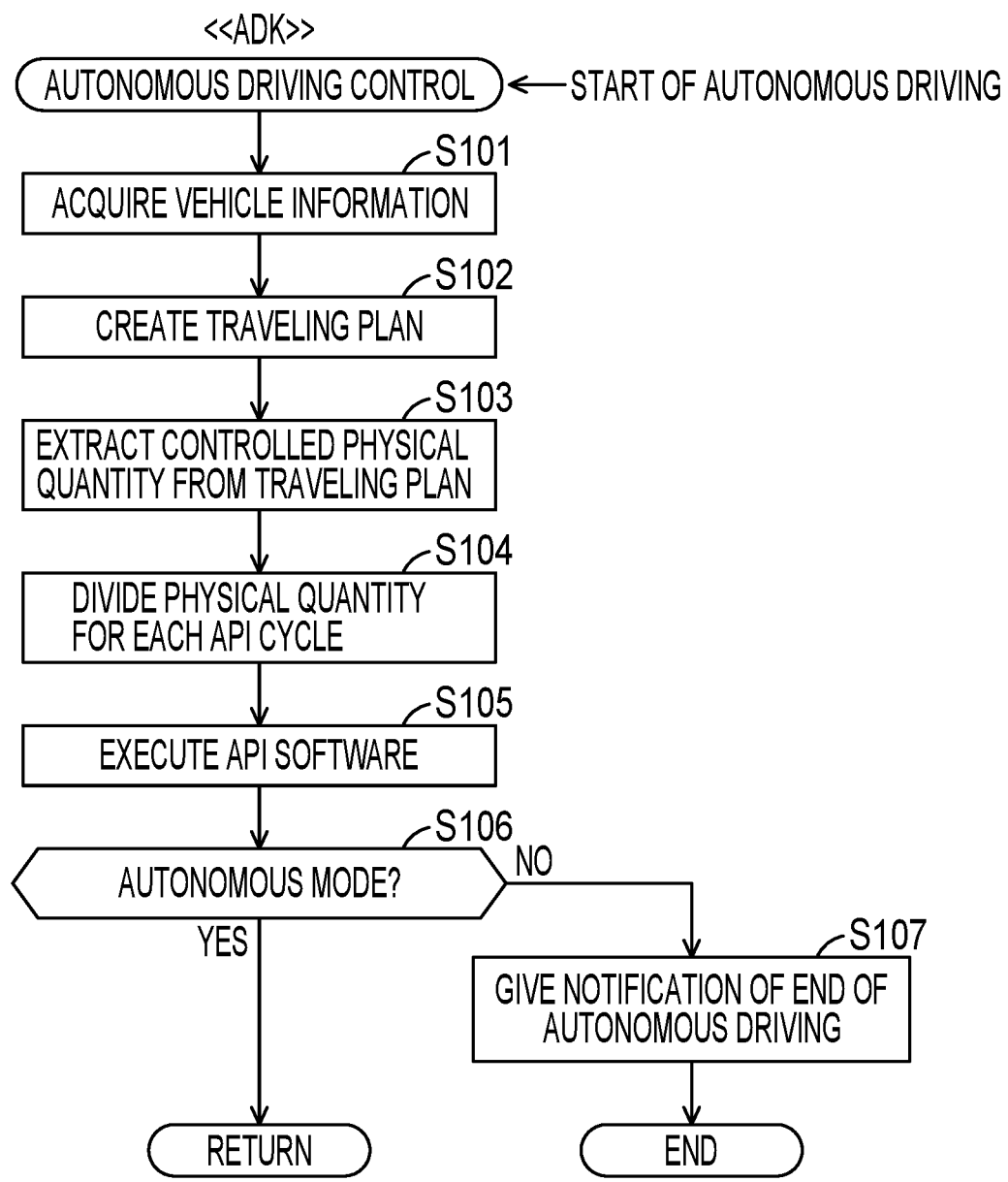
FIG. 3 is a flowchart showing a processing procedure of autonomous driving control according to the embodiment of the present disclosure.

FIG. 3 is a flowchart showing processing executed by the ADK 200 in the autonomous driving control according to the present embodiment. The processing shown in this flowchart is repeatedly executed in a cycle corresponding to the API (API cycle) in a case where the vehicle 1 is in the autonomous mode. In a case where the driving mode of the vehicle 1 is switched from the manual mode to the autonomous mode, after a start signal indicating the start of autonomous driving is transmitted from the vehicle 1 (communication device 130) to the server 500 together with the identification information of the vehicle 1, a series of processing shown in FIG. 3 described below is started. In the following, each step in the flowchart is simply referred to as "S".

With reference to FIG. 3 together with FIGS. 1 and 2, in S101, the computer 210 acquires the current information of the vehicle 1. For example, the computer 210 acquires the environmental information and the posture information of the vehicle 1 from the recognition sensor 260 and the posture sensor 270. Further, the computer 210 acquires the API signal. In the present embodiment, the API signal indicating the state of the vehicle 1 is sequentially output from the VCIB 111 to the ADK 200 in real time regardless of whether the vehicle 1 is in any of the autonomous mode and the manual mode. In order to improve the accuracy of the autonomous driving control, the state of the vehicle 1 may be sequentially transmitted from the integrity control manager 115 to the ADK 200 in a shorter cycle in the autonomous mode than in the manual mode. The API signal acquired by the computer 210 includes, in addition to the autonomous state described above, signals indicating the rotation direction and the rotation speed of each wheel detected by the wheel speed sensors 127A, 127B.

In S102, the computer 210 creates the traveling plan based on the information of the vehicle 1 acquired in S101. For example, the computer 210 calculates the behavior of the vehicle 1 (for example, the posture of the vehicle 1) and creates the traveling plan suitable for the state of the vehicle 1 and the external environment. The traveling plan is data indicating the behavior of the vehicle 1 within a predetermined period. In a case where the traveling plan is already present, the traveling plan may be amended in S102.

In S103, the computer 210 extracts a controlled physical quantity (acceleration, tire turning angle, or the like) from the traveling plan created in S102. In S104, the computer 210 divides the physical quantity extracted in S103 for each API cycle. In S105, the computer 210 executes the API software by using the physical quantity divided in S104. By executing the API software in this way, the API command (propulsion direction command, propulsion command, braking command, vehicle fixing command, or the like) requesting control to realize the physical quantity in accordance with the traveling plan is transmitted from the ADK 200 to the VCIB 111. The VCIB 111 transmits the control command corresponding to the received API command to the integrity control manager 115, and the integrity control manager 115 executes the autonomous driving control of the vehicle 1 in response to the control command.

In following S106, the computer 210 determines whether or not the vehicle 1 is in the autonomous mode. While the autonomous mode is maintained (YES in S106), autonomous driving of the vehicle 1 is executed by repeatedly executing the processing of S101 to S105. On the other hand, in a case where the vehicle 1 is in the manual mode (NO in S106), in S107, an end signal indicating the end of autonomous driving is transmitted from the vehicle 1 (communication device 130) to the server 500 together with the identification information of the vehicle 1, and then the series of processing shown in FIG. 3 ends. In the present embodiment, the computer 210, the VCIB 111, and the integrity control manager 115 cooperate to execute control to cause the vehicle 1 to travel by autonomous driving. The vehicle 1 can be autonomously driven in any of manned and unmanned states. It should be noted that the autonomous driving control is not limited to the control shown in FIG. 3, and other controls (known autonomous driving control) may be adopted.

Figure 4:
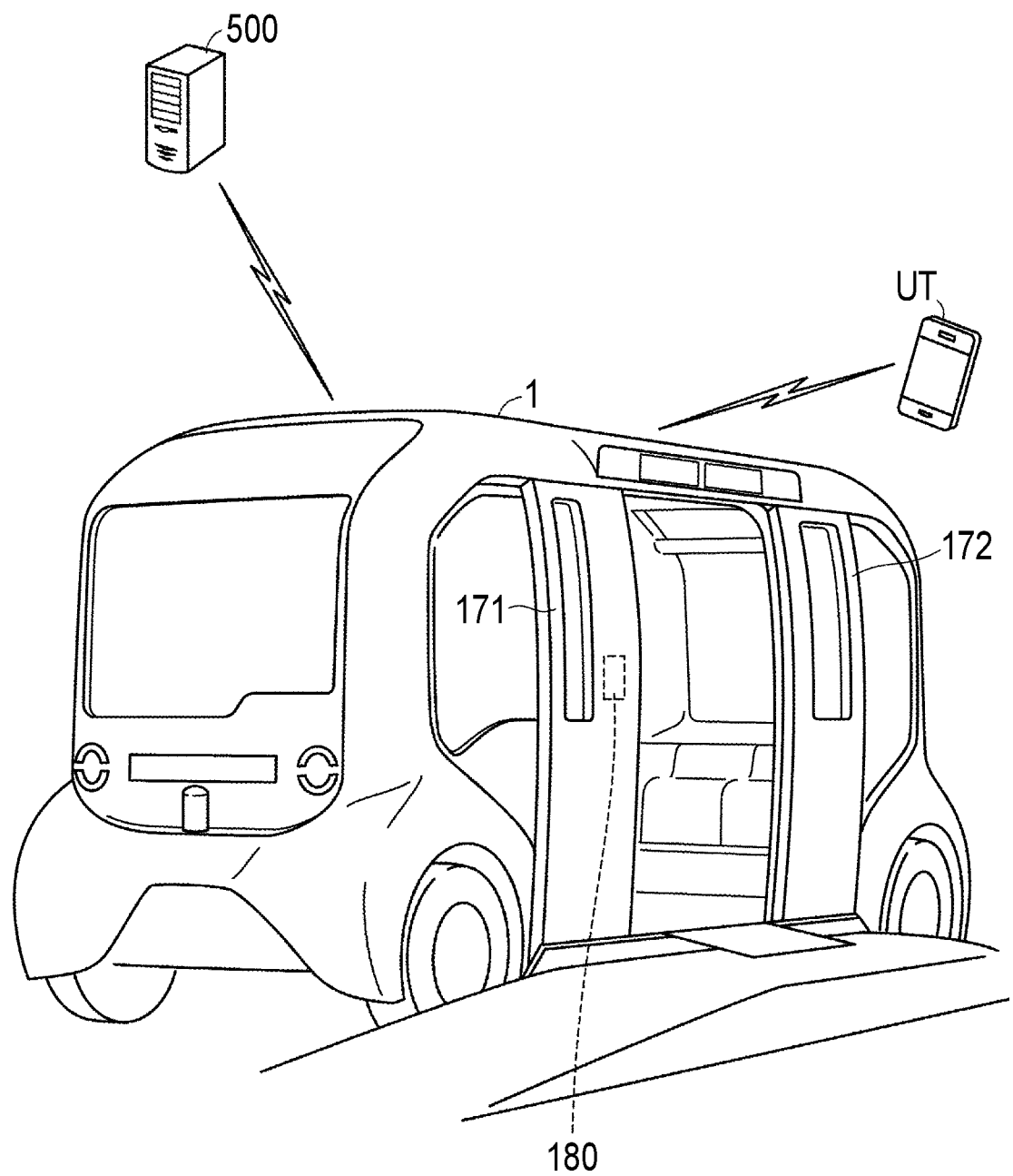
FIG. 4 is a view showing an appearance of the vehicle shown in FIG. 1.

FIG. 4 is a diagram showing an appearance of the vehicle 1. With reference to FIG. 4 together with FIGS. 1 and 2, the vehicle 1 includes a pair of doors 171, 172, and a reader 180. The doors 171, 172, and the reader 180 are provided at an entrance (passenger entrance) of the vehicle 1. The doors 171, 172 are sliding doors that are opened and closed in accordance with the instruction from the ECU of the body system 126 (FIG. 1). The reader 180 is configured to read predetermined identification information from the image. More specifically, the reader 180 captures the image, extracts a predetermined code from the image, and executes decoding processing. The code extracted from the image is converted into the predetermined identification information by the decoding processing described above. Moreover, the reader 180 outputs the identification information read from the image to the ECU of the body system 126 (FIG. 1). It should be noted that, the reading method of the reader 180 is not limited to the above and is optional. For example, the reader 180 may be a radio frequency identification (RFID) reader.

A vehicle management system according to the present embodiment includes the vehicle 1, the mobile terminal UT, and the server 500. The server 500 manages the vehicle 1. Although solely the vehicle 1 is referred to in the present embodiment, the server 500 may manage a number of vehicles. The server 500 may manage a service usage price and an incentive described below for each user, in addition to the information on the vehicle 1. The server 500 corresponds to an example of a "management device" according to the present disclosure.

In the present embodiment, the vehicle 1 provides a passenger transportation service by autonomous driving in a state in which a driver is not present. That is, the vehicle manager is not present in the vehicle 1. Basically, solely a service user gets on the vehicle 1, and in a case where all the service users get off the vehicle, the vehicle 1 is in the unmanned state. For example, the vehicle 1 may travels to go around a predetermined route within a running region by autonomous driving, for example, as a fixed-route bus. In addition, the vehicle 1 may decide a route in accordance with each request and execute traveling by autonomous driving in accordance with the decided route (on-demand route). During autonomous driving of the vehicle 1, the processing shown in FIG. 3 is executed, and the control device 150 controls various systems (for example, the brake system 121, the steering system 122, the powertrain system 123, the active safety system 125, and the body system 126 shown in FIG. 2) of the vehicle 1 in response to the command from the ADK 200.

The server 500 can specify the user who is using the vehicle 1 and notify the vehicle manager of information on the user. The server 500 manages the information (user information) on each user registered in the storage device 503. Identification information (user ID) for identifying the user is assigned to each user, and the server 500 manages the user information by distinguishing the user information using the user ID. In the present embodiment, each user registered in the server 500 carries the mobile terminal UT. The user information includes personal information (name, address, age, service usage history, and the like) and an address of the mobile terminal UT carried by the user.

Application software for using the vehicle 1 (hereinafter, referred to as "mobile application") is installed in the mobile terminal UT. In a case where the user uses the vehicle 1, the mobile terminal UT displays the image including the identification information (user ID) of the user. Moreover, in a case where the user holds the mobile terminal UT that displays the image over the reader 180 of the vehicle 1, the reader 180 reads the user ID from the image. In a case where the reader 180 successfully reads the user ID, the ECU of the body system 126 (FIG. 1) drives the doors 171, 172 to be opened. Moreover, after the user gets on the vehicle 1, the ECU of the body system 126 (FIG. 1) drives the doors 171, 172 to be closed. Similarly, when the user gets off the vehicle, the doors 171, 172 are opened and closed through user authentication by the reader 180.

The user ID read by the reader 180 is transmitted from the vehicle 1 to the server 500. The server 500 specifies the user who is using the vehicle 1 based on the received user ID. The server 500 acquires the user information corresponding to the user ID from the storage device 503 and displays the acquired user information on the HMI 504 in response to a request from the vehicle manager. In addition, the server 500 transmits the information on the user who is using the vehicle 1 to the vehicle 1 in response to a request from the vehicle 1.

Figure 5:
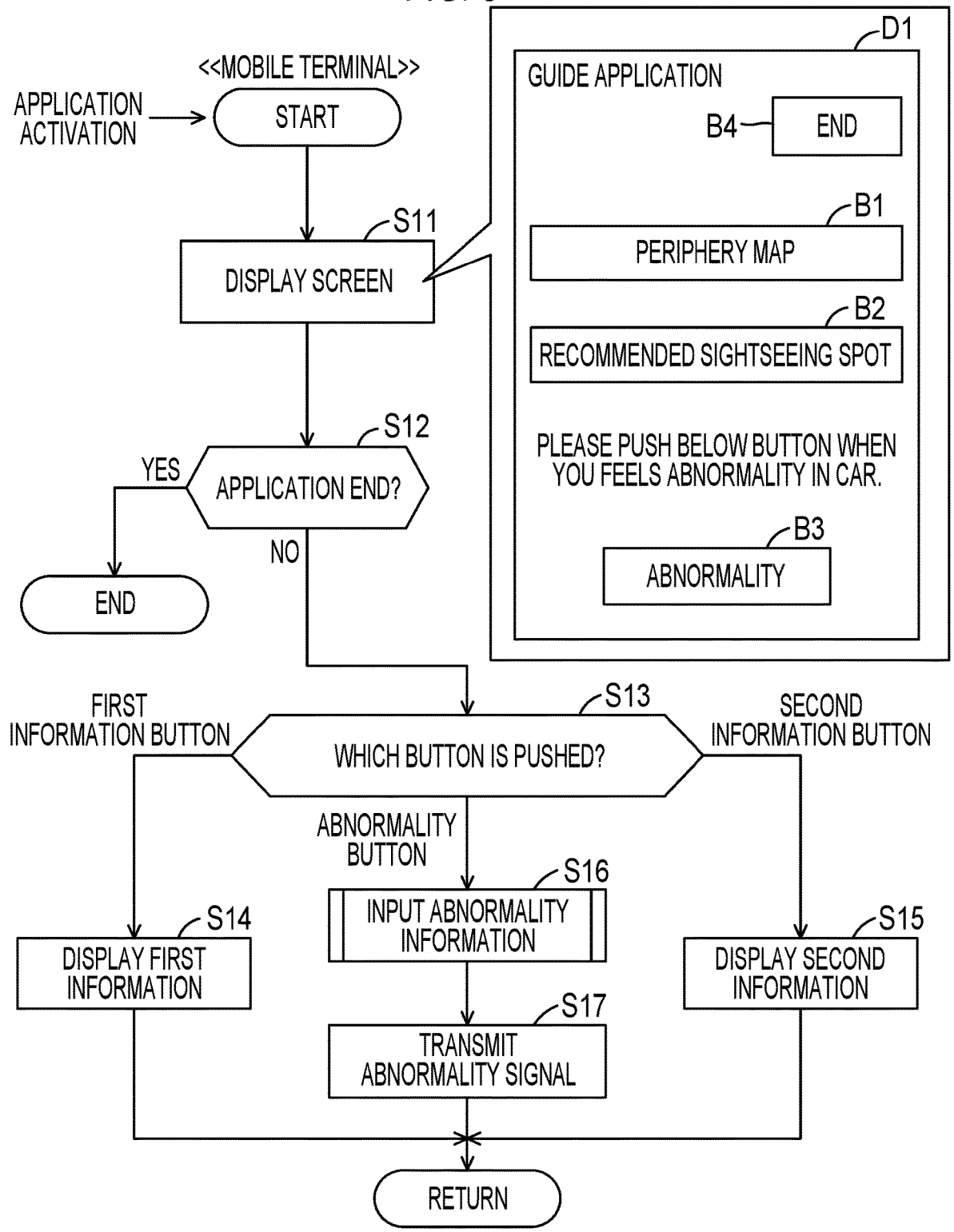
FIG. 5 is a flowchart showing processing executed by a mobile terminal carried by a user who is using the vehicle shown in FIG. 1.

In a case where the user authentication described above is successful between the mobile terminal UT and the reader 180 when the user gets on the vehicle 1, the mobile application is activated, and a series of processing shown in FIG. 5 described below is executed by the mobile application. FIG. 5 is a flowchart showing processing executed by the mobile terminal UT carried by the user who is using the vehicle 1.

With reference to FIG. 5 together with FIGS. 1 to 4, in S11, the mobile terminal UT displays a screen D1. The screen D1 displays a first information button B1, a second information button B2, an abnormality button B3, and an end button B4. Subsequently, in S12, the mobile terminal UT determines whether or not an end condition of the mobile application is established. In a case where the end condition of the mobile application is established (YES in S12), the series of processing shown in FIG. 5 ends.

In the present embodiment, in a case where the user operates the end button B4 on the screen D1, the end condition of the mobile application is established. In addition, in a case where the user authentication described above is successful between the mobile terminal UT and the reader 180 when the user gets off the vehicle 1, the end condition of the mobile application is established.

In the present embodiment, in a case where the user operates a button (any of the first information button B1, the second information button B2, and the abnormality button B3) other than the end button B4 on the screen D1, the mobile terminal UT determines that the end condition of the mobile application is not established (NO in S12), and the processing proceeds to S13. In S13, the mobile terminal UT determines which of the first information button B1, the second information button B2, and the abnormality button B3 is operated.

In a case where the first information button B1 is operated, the mobile terminal UT displays predetermined first information in S14. In the present embodiment, the mobile terminal UT displays a periphery map of the vehicle 1 as the first information. In a case where the second information button B2 is operated, the mobile terminal UT displays predetermined second information in S15. In the present embodiment, the mobile terminal UT displays information on a sightseeing spot in the periphery of the vehicle 1 as the second information. In a case where the processing of any of S14 or S15 is executed, the processing returns to the first step (S11).

Figure 6:
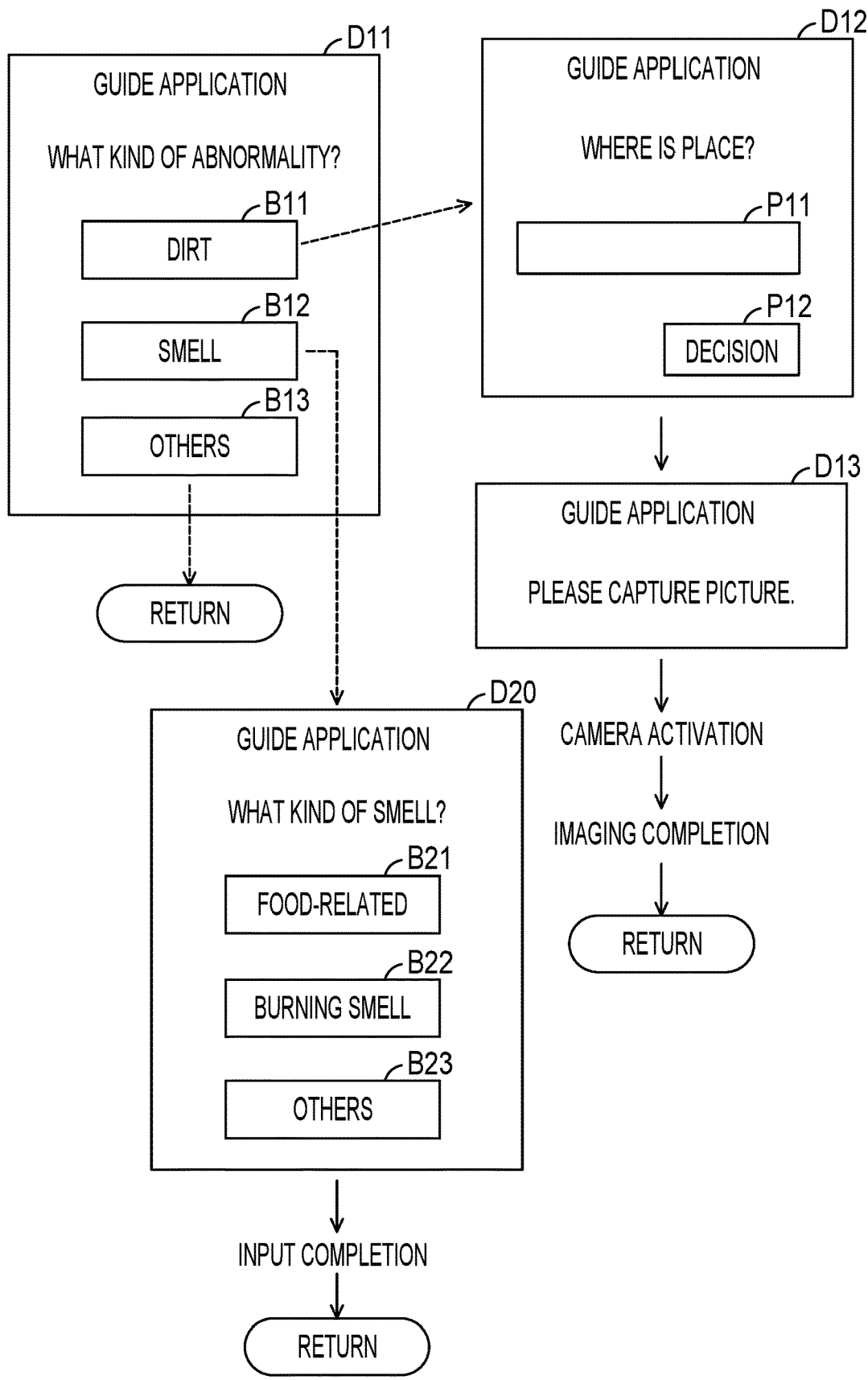
FIG. 6 is a flowchart showing details of processing related to input of abnormality information shown in FIG. 5.

In a case where the abnormality button B3 is operated, the mobile terminal UT requests the user to input the abnormality information in S16. The operation of the abnormality button B3 means that the user who is using the vehicle 1 has felt the abnormality in the vehicle 1. The user who is using the vehicle 1 can notify the vehicle manager of the abnormality of the vehicle 1 by pushing the abnormality button B3. FIG. 6 is a diagram for describing the processing of S16.

With reference to FIGS. 1 to 4 together with FIG. 6, in S16 of FIG. 5, first, the mobile terminal UT displays a screen D11. The screen D11 prompts the user to input a kind of the abnormality (dirt/smell/others). The screen D11 displays a dirt button B11, a smell button B12, and an others button B13.

In a case where the dirt button B11 in the screen D11 is operated, the mobile terminal UT displays a screen D12. The screen D12 prompts the user to input a dirty place. The screen D12 displays an input field P11 and a decision button P12. The user can input characters in the input field P11. For example, in a case where the user touches the input field P11, a keypad for character input is displayed. In a case where the user operates the decision button P12 after inputting the information indicating the dirty place in the input field P11, the mobile terminal UT displays a screen D13.

The screen D13 prompts the user to capture a picture of the dirty place. Moreover, a camera of the mobile terminal UT is activated. In a case where the user completes capturing the picture, the processing returns to the flowchart in FIG. 5 and proceeds to S17.

In a case where the smell button B12 in the screen D11 is operated, the mobile terminal UT displays a screen D20. The screen D20 prompts the user to input a kind of the smell (food-related/burning/others). The screen D20 displays buttons B21 to B23. The operation of the button B21 by the user means that the user has felt the food-related smell in the vehicle. The operation of the button B22 by the user means that the user has felt the burning smell in the vehicle. The operation of the button B23 by the user means that the user has felt other smells (smell other than food-related and burning smells) in the vehicle.

In a case where any of the buttons B21 to B23 is operated by the user, the processing returns to the flowchart of FIG. 5 and proceeds to S17. It should be noted that, in a case where a predetermined time has elapsed since the input request before the input is completed (that is, in a case where a time is out without the response of the user to the request on each screen shown in FIG. 6), the processing may return to S11 in FIG. 5.

With reference to FIGS. 1 to 4 together with FIG. 5 again, in S17, the mobile terminal UT transmits an abnormality signal for notifying of the abnormality of the vehicle 1 to the server 500. In a case where the processing of S17 is executed, the processing returns to the first step (S11).

The abnormality signal in S17 includes the information (see FIG. 6) input in S16. That is, the abnormality signal indicates the kind of the abnormality. In the present embodiment, the abnormality signal indicates whether the abnormality that has occurred in the vehicle 1 corresponds to dirt, smell, or others (abnormality other than dirt and smell). In addition, in a case where the abnormality is the dirt, the abnormality signal further includes information for specifying the dirt place and image information (result captured by the camera) indicating a state of the dirt place. In a case where the abnormality is the smell (abnormal smell), the abnormality signal indicates whether the smell corresponds to food-related, burning, or others (smell other than food-related and burning smells).

As described above, the mobile terminal UT receives a predetermined start operation (operation of the abnormality button B3) on the screen D1 shown in FIG. 5. In a case where the start operation is executed for the mobile terminal UT ("abnormality button" in S13), the mobile terminal UT requests the input of the kind of the abnormality that has occurred in the vehicle 1 on the screens D11 to D13, and D20 shown in FIG. 6. In a case where the input of the kind of the abnormality is received from various buttons shown in FIG. 6, the mobile terminal UT transmits the abnormality signal indicating the kind of the abnormality to the server 500.

Figure 7:
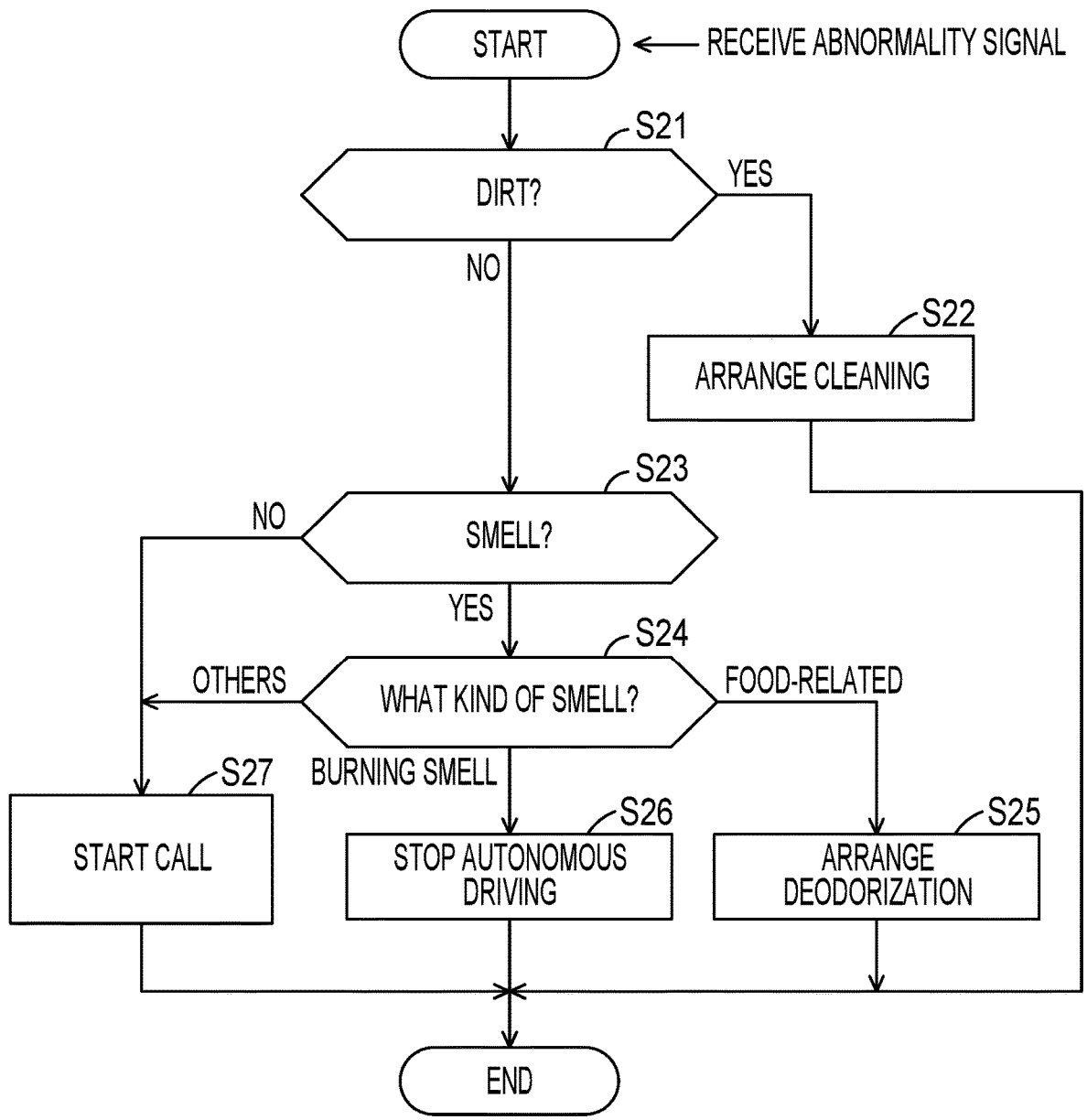
FIG. 7 is a flowchart showing processing executed by a management device (server) shown in FIG. 1.

In a case where the abnormality signal is received, the server 500 executes a series of processing shown in FIG. 7 described below. FIG. 7 is a flowchart showing processing executed by the server 500 that receives the abnormality signal.

With reference to FIGS. 1 to 4 together with FIG. 7, in S21, the server 500 determines whether or not the kind of the abnormality that has occurred in the vehicle 1 is "dirt". The server 500 makes the determination of S21 based on the received abnormality signal. For example, in a case where the dirt button B11 shown in FIG. 6 is operated by the user in S16 of FIG. 5, the abnormality signal indicates that the kind of the abnormality is "dirt", and a YES determination is made in S21. In addition, in a case where the dirt button B11 shown in FIG. 6 is not operated in S16 of FIG. 5, the abnormality signal indicates that the kind of the abnormality is not "dirt", and a NO determination is made in S21.

In a case where a YES determination is made in S21, the server 500 executes an arrangement of cleaning in S22. Specifically, the server 500 transmits a signal for requesting the cleaning (hereinafter, also referred to as "cleaning request signal") to a terminal of a cleaning company. In addition, the server 500 notifies the mobile terminal UT that the arrangement of the cleaning is executed. In this case, the user who carries the mobile terminal UT may be given a predetermined incentive (for example, virtual currency that can be used to pay the service price) as a reward for reporting the abnormality.

The cleaning request signal includes information for specifying the dirt place and image information (result captured by the camera) indicating the state of the dirt place. These pieces of information are indicated by the abnormality signal. The cleaning by the requested cleaning company may be executed while the vehicle 1 runs. For example, the cleaning of the vehicle 1 may be executed after current running of the vehicle 1 ends (for example, travels to go around or an on-demand running in accordance with request) and before next running is started. By cleaning the vehicle 1 by the cleaning company, the vehicle 1 returns to a normal state (state with no abnormality). In a case where the processing of S22 is executed, the series of processing shown in FIG. 7 ends.

In a case where a NO determination is made in S21, the server 500 determines in S23 whether or not the kind of the abnormality that has occurred in the vehicle 1 is "smell". The server 500 makes the determination of S23 based on the received abnormality signal. For example, in a case where the smell button B12 shown in FIG. 6 is operated by the user in S16 of FIG. 5, the abnormality signal indicates that the kind of the abnormality is "smell", and a YES determination is made in S23. In addition, in a case where the smell button B12 shown in FIG. 6 is not operated in S16 of FIG. 5, the abnormality signal indicates that the kind of the abnormality is not "smell", and a NO determination is made in S23.

In a case where a YES determination is made in S23, the server 500 determines in S24 whether the kind of the smell is any of the food-related, burning, and others.

In a case where the button B21 shown in FIG. 6 is operated by the user in S16 of FIG. 5, a determination is made in S24 that the kind of the smell corresponds to "food-related". In this case, the processing proceeds to S25. In S25, the server 500 executes an arrangement of the deodorization. Specifically, the server 500 transmits a signal requesting deodorization (hereinafter, also referred to as "deodorization request signal") to a terminal of a person in charge of deodorization. In addition, the server 500 notifies the mobile terminal UT that the arrangement of the deodorization is executed. In this case, the user who carries the mobile terminal UT may be given the predetermined incentive as the reward for reporting the abnormality. A person in charge of deodorization who receives the request described above may execute the deodorization in the vehicle while the vehicle 1 runs. By executing the deodorization, the vehicle 1 returns to the normal state (state with no abnormality). In a case where the processing of S25 is executed, the series of processing shown in FIG. 7 ends.

In a case where the button B22 shown in FIG. 6 is operated by the user in S16 of FIG. 5, a determination is made in S24 that the kind of the smell corresponds to "burning smell". In this case, the processing proceeds to S26. In S26, the server 500 notifies the mobile terminal UT of emergency stop, and the server 500 transmits a signal for requesting the vehicle 1 to stop (hereinafter, also referred to as "stop request signal"). In addition, the user who carries the mobile terminal UT may be given the predetermined incentive as the reward for reporting the abnormality.

In a case where the stop request signal is received from the server 500, the control device 150 of the vehicle 1 executes stop control of the vehicle 1 in cooperation with the ADK 200. Specifically, the control device 150 stops the vehicle 1 in a place that does not interfere with traffic, and stops autonomous driving. The vehicle manager dispatches a worker to restore the vehicle 1 to the stop position of the vehicle 1. Dispatch of the worker may be automatically executed by the server 500. In addition, the vehicle manager sends a vehicle (substitute vehicle) to replace the vehicle 1 to the stop position of the vehicle 1 as needed. The arrangement of the substitute vehicle may be automatically executed by the server 500. The worker inspects the vehicle 1 and executes needed maintenance (for example, retouch or component replacement) to return the vehicle 1 to the normal state (state with no abnormality). In a case where the processing of S26 is executed, the series of processing shown in FIG. 7 ends.

In the vehicle management system according to the present embodiment, in a case where the kind of the abnormality indicated by the abnormality signal is "burning smell" ("burning smell" in S24), the server 500 stops autonomous driving of the vehicle 1. In the present embodiment, "burning smell" corresponds to an example of a "predetermined first kind" according to the present disclosure. The predetermined first kind according to the present embodiment is a kind to which the abnormality that hinders autonomous driving of the vehicle 1 belongs.

On the other hand, in a case where the kind of the abnormality indicated by the abnormality signal is "dirt" or "food-related smell" (YES in S21, or "food-related" in S24), the server 500 continues autonomous driving of the vehicle 1. In the present embodiment, each of "dirt" and "food-related smell" corresponds to an example of a "predetermined second kind" according to the present disclosure. The predetermined second kind according to the present embodiment is a kind to which the abnormality that does not hinder autonomous driving of the vehicle 1 belongs.

In a case where the button B23 shown in FIG. 6 is operated by the user in S16 of FIG. 5, a determination is made in S24 that the kind of the smell corresponds to "others". In this case, the processing proceeds to S27. In addition, in a case where a NO determination is made in S23, the processing proceeds to S27. In a case where the others button B13 shown in FIG. 6 is operated by the user in S16 of FIG. 5, a NO determination is made in S23.

In S27, the server 500 connects a predetermined terminal having the call function to the mobile terminal UT to enable the call between the terminals. The predetermined terminal is, for example, a terminal belonging to the vehicle manager. The user who is using the vehicle 1 can explain a status of the vehicle 1 to the person in charge (vehicle manager) by using the mobile terminal UT. It should be noted that artificial intelligence (AI) may be used instead of the person in charge (human). The user who carries the mobile terminal UT may be given the predetermined incentive as the reward for reporting the abnormality.

In the vehicle management system according to the present embodiment, in a case where the kind of the abnormality indicated by the abnormality signal is "others" (NO in S23 or "others" in S24), the server 500 starts the call between the predetermined terminal and the mobile terminal UT. As a result, it is easier for the vehicle manager to check the details of the abnormality through the call between the person who has discovered the abnormality and the vehicle manager. The fact that the kind of the abnormality indicated by the abnormality signal is "others" means that the kind of the abnormality indicated by the abnormality signal is unknown.

In a case where the call described above ends, the series of processing shown in FIG. 7 ends. After the call described above ends, the vehicle manager can take appropriate measures with respect to the vehicle 1 based on the status of the vehicle 1 heard from the user. For example, in a situation in which the vehicle 1 cannot continue traveling, the vehicle manager may use the server 500 to execute the same processing as the processing of S26 described above. In addition, in a situation in which the vehicle 1 can continue traveling, the vehicle manager may execute needed maintenance (for example, inspection, retouch, or component replacement) between intervals of running of the vehicle 1.

As described above, the vehicle management method according to the present embodiment includes the processing shown in FIGS. 5 to 7.

In S12, S13, and S16 of FIG. 5, the mobile terminal UT (signal transmission device) determines whether or not the predetermined operation is executed for the mobile terminal UT in the vehicle 1 during autonomous driving without the presence of the manager. In the present embodiment, operating the abnormality button B3 in the screen D1 shown in FIG. 5 and executing the requested input in S16 of FIG. 5 correspond to an example of a "predetermined operation (abnormality notification operation)" according to the present disclosure.

In a case where predetermined operation is executed for the mobile terminal UT, the mobile terminal UT transmits the abnormality signal for notifying of the abnormality of the vehicle 1 to the server 500 (management device) that manages the vehicle 1 in S17 of FIG. 5.

With the vehicle management method described above, in a case where the abnormality has occurred in the vehicle 1 during autonomous driving without the presence of the manager, it is possible to cope with the abnormality at an early stage.

The processing shown in FIGS. 5 to 7 is merely an example, and can be changed as appropriate. For example, the mobile terminal UT may execute the processing shown in FIG. 8 instead of the processing shown in FIG. 5. In addition, the server 500 may execute the processing shown in FIG. 9 instead of the processing shown in FIG. 7.

Figure 8:
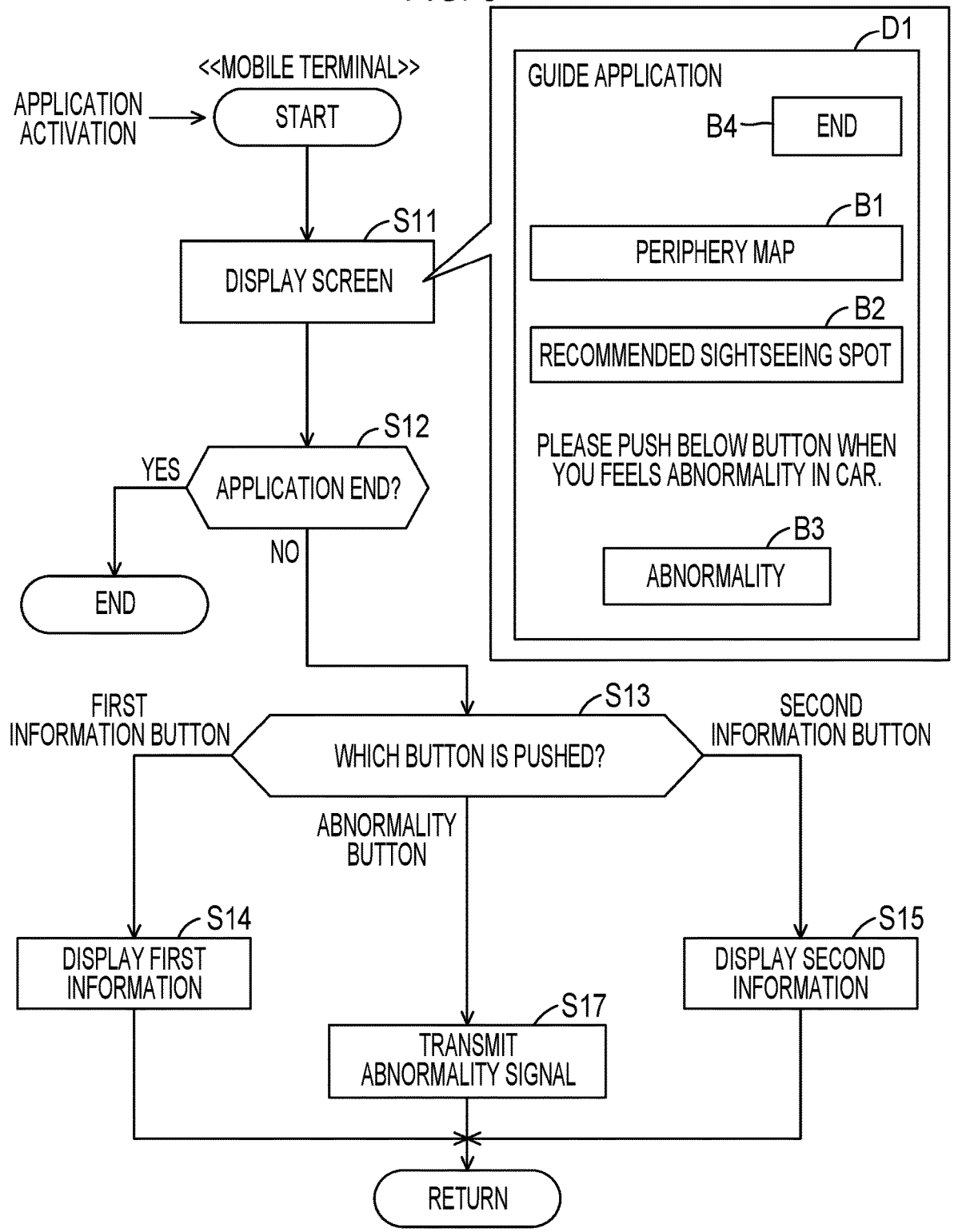
FIG. 8 is a flowchart showing a modification example of the processing shown in FIG. 5.

FIG. 8 is a flowchart showing a modification example of the processing shown in FIG. 5. The processing shown in FIG. 8 is the same as the processing shown in FIG. 5 except that S16 (FIG. 5) is omitted. With reference to FIG. 8, in the present modification example, the mobile terminal UT does not request the input of the kind of the abnormality. In the present modification example, operating the abnormality button B3 in the screen D1 corresponds to an example of a "predetermined operation (abnormality notification operation)" according to the present disclosure. In a case where the abnormality button B3 in the screen D1 is operated ("abnormality button" in S13), the mobile terminal UT transmits the abnormality signal to the server 500 in S17. The abnormality signal notifies of the abnormality of the vehicle 1, but does not indicate the kind of the abnormality.

Figure 9:
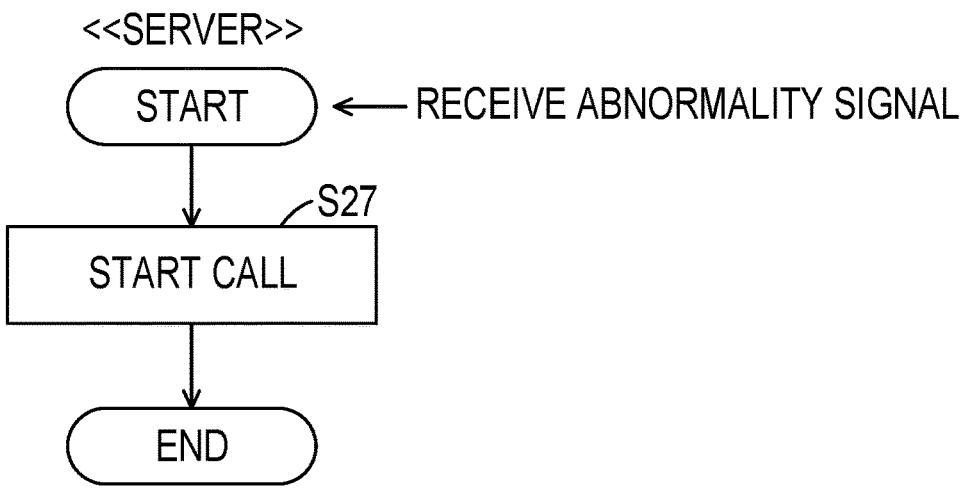
FIG. 9 is a flowchart showing a modification example of the processing shown in FIG. 7.

In a case where the abnormality signal is received, the server 500 executes the processing shown in FIG. 9. FIG. 9 is a flowchart showing a modification example of the processing shown in FIG. 7. With reference to FIG. 9, in the present modification example, the server 500 that receives the abnormality signal starts the call between the predetermined terminal and the mobile terminal UT in S27. S27 in FIG. 9 is the same as S27 in FIG. 7.

According to the above modification example, in a case where the abnormality has occurred in the vehicle 1 during autonomous driving without the presence of the manager, it is also possible to cope with the abnormality at an early stage. In the processing shown in FIG. 9, S27 has been adopted as the solely step, but S26 (FIG. 7) may be adopted instead of S27.

The mobile terminal UT (signal transmission device) may receive the predetermined abnormality notification operation (operation for transmitting the abnormality signal) solely in a case where a predetermined condition (hereinafter, also referred to as "reception condition") is established. For example, the mobile application may execute a series of processing shown in FIG. 10 described below in parallel with the processing shown in FIG. 5.

Figure 10:
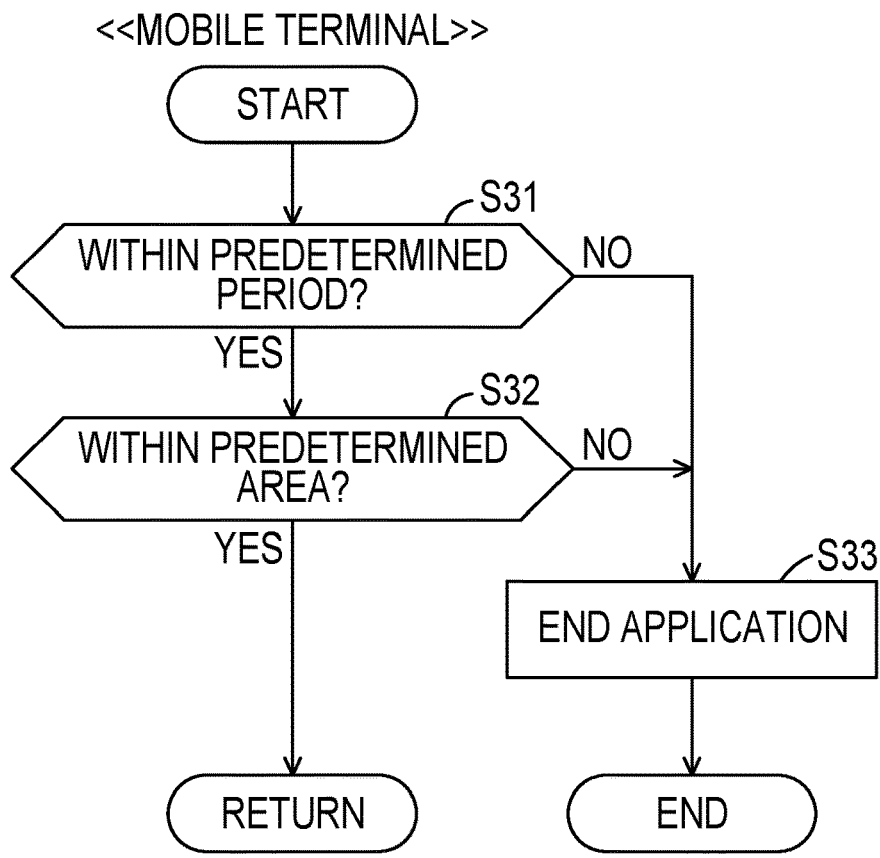
FIG. 10 is a flowchart for describing an example of a reception condition.

FIG. 10 is a flowchart for describing an example of the reception condition. With reference to FIG. 10 together with FIGS. 1 to 4, in S31, the mobile terminal UT determines whether or not a time is within a predetermined period (hereinafter, also referred to as "reception period"). In addition, in S32, the mobile terminal UT determines whether or not the vehicle 1 is present within a predetermined area (hereinafter, also referred to as "reception area").

A period during which the abnormality is likely to occur in the vehicle 1 may be set as the reception period in S31. In one example, the reception period is defined as a period after a predetermined time has elapsed from the execution of the maintenance for the vehicle 1. That is, a YES determination is made in S31 in a case where the predetermined time has elapsed from the execution of the maintenance for the vehicle 1, and a NO determination is made in S31 in a case where the predetermined time has not elapsed from the execution of the maintenance for the vehicle 1. It should be noted that the present disclosure is not limited to this, and the reception period can be set optionally. For example, a predetermined time zone (for example, a time zone in which congestion is likely to occur) may be set as the reception period. The reception period may be designated by a time, such as a period from 10:00 to 15:00 on the day.

An area during which the abnormality is likely to occur in the vehicle 1 may be set as the reception area in S32. In one example, an area including a rough road (for example, a road in which vibration is likely to occur in the vehicle 1 during traveling) is set as the reception area. It should be noted that the present disclosure is not limited to this, and the reception area can be set optionally. For example, an area separated by a predetermined distance or more from a departure point of the vehicle 1 may be set as the reception area. The reception area may be designated by longitude and latitude, or may be designated by a section (for example, region name) on the map.

In a case where a YES determination is made in both S31 and S32, the processing returns to the first step (S31). A YES determination in both S31 and S32 means that the reception condition is established. On the other hand, in a case where a NO determination is made in S31 or S32, in S33, the mobile application ends. Specifically, the end condition of the mobile application is established by the processing of S33. As a result, the series of processing shown in FIG. 10 ends. In addition, in a case where the end condition of the mobile application is established, the series of processing shown in FIG. 5 ends (see S12 in FIG. 5). A NO determination in S31 or S32 means that the reception condition is not established.

As described above, the mobile terminal UT is configured to receive the abnormality notification operation by the processing shown in FIG. 5 in a case where the vehicle 1 is autonomously driven without the presence of the manager within the predetermined area within the predetermined period (YES in both S31 and S32), and is configured not to receive the abnormality notification operation in a case where the vehicle 1 is present outside the predetermined area or in a case where the current time is outside the predetermined period. The determination of whether or not the abnormality notification operation is executed in the processing shown in FIG. 5 is executed solely in a case where the vehicle 1 is autonomously driven without the presence of the manager within the predetermined area within the predetermined period. By the series of processing shown in FIG. 10 described above, the period and area for receiving the abnormality notification operation are limited, so that the decrease in the operating rate of the vehicle 1 due to unneeded vehicle maintenance is suppressed. It should be noted that the series of processing shown in FIG. 10 may be changed as appropriate. For example, any one of S31 and S32 may be omitted. The mobile terminal UT may determine whether or not the abnormality notification operation is executed by the processing shown in FIG. 8 instead of the processing shown in FIG. 5.

In the embodiment described above, the signal transmission device is mounted on the mobile terminal UT. However, the present disclosure is not limited to this, and the signal transmission device may be mounted on the vehicle.

Figure 11:
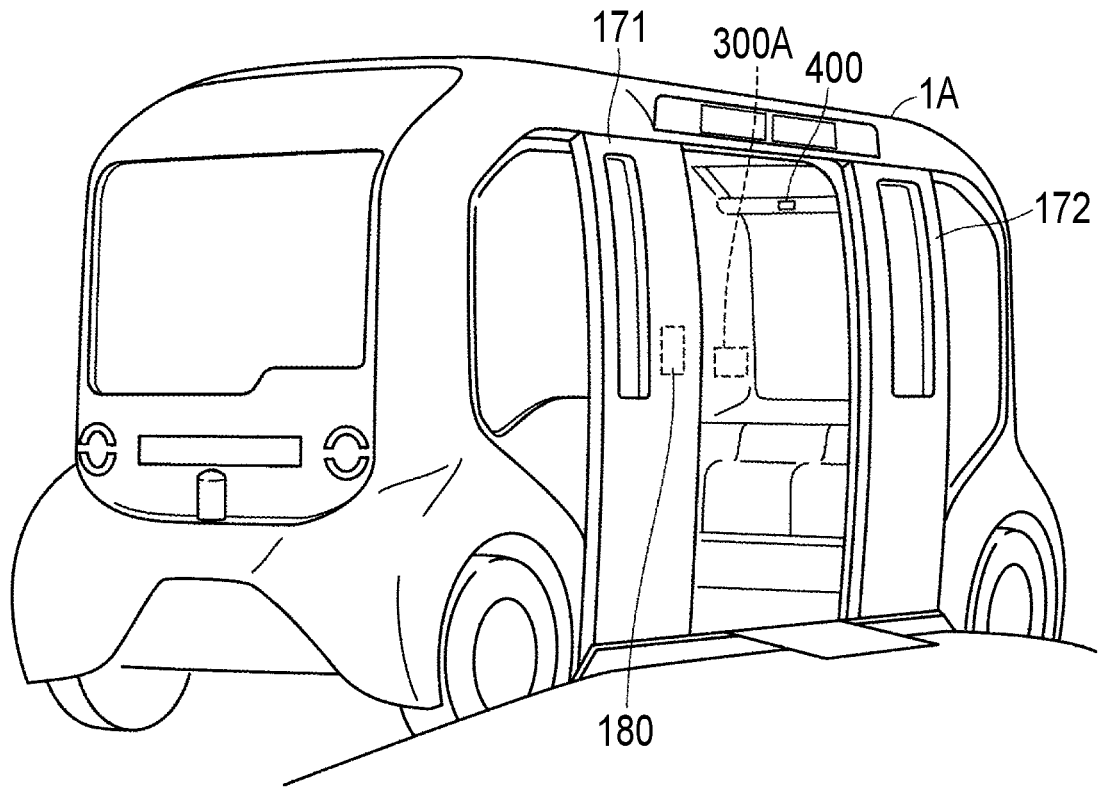
FIG. 11 is a diagram for describing a configuration of a first vehicle including a signal transmission device.

FIG. 11 is a diagram for describing a configuration of a vehicle 1A (first vehicle) including the signal transmission device. Since the configuration of the vehicle 1A is basically the same as the configuration of the vehicle 1 according to the embodiment described above, a difference will be mainly described below, and the description of common parts will be omitted.

With reference to FIG. 11, the vehicle 1A includes a signal transmission device 300A and a camera 400 having functions corresponding to the mobile terminal UT according to the embodiment described above. Specifically, the signal transmission device 300A has a sheet-like outer shape and is installed on an inner wall surface of the vehicle 1A. The signal transmission device 300A is fixed (for example, embedded) in the wall such that the signal transmission device 300A cannot be taken out of the vehicle 1A. It should be noted that the present disclosure is not limited to this, and the signal transmission device 300A may be detachable from a wall (or a bracket provided on the wall). The signal transmission device 300A may be integrated with a window of the vehicle 1A.

The signal transmission device 300A includes a built-in computer, and software corresponding to the mobile application described above is installed in the signal transmission device 300A. The signal transmission device 300A is equipped with a touch panel display and has the call function. The camera 400 is installed to be able to image the inside of the vehicle. The number of cameras mounted on the vehicle 1A is not limited to one, and may be plural. The signal transmission device 300A is configured to communicate with the camera 400. The signal transmission device 300A transmits the image captured by the camera 400 to the server 500 in response to the request from the server 500.

In a case where the user touches a touch panel screen of the signal transmission device 300A, the signal transmission device 300A may start the series of processing shown in FIG. 5. It should be noted that, since the state inside the vehicle is imaged by the camera 400, capturing the picture by the user (screen D13 in FIG. 6) is omitted in S16 of FIG. 5. The signal transmission device 300A may execute the series of processing shown in FIG. 10 in parallel with the processing shown in FIG. 5. The signal transmission device 300A may execute the processing shown in FIG. 8 instead of the processing shown in FIG. 5. With the vehicle 1A, it is possible to transmit the abnormality signal from the vehicle 1A to the server 500 (S17 in FIG. 5 or FIG. 8).

Figure 12:
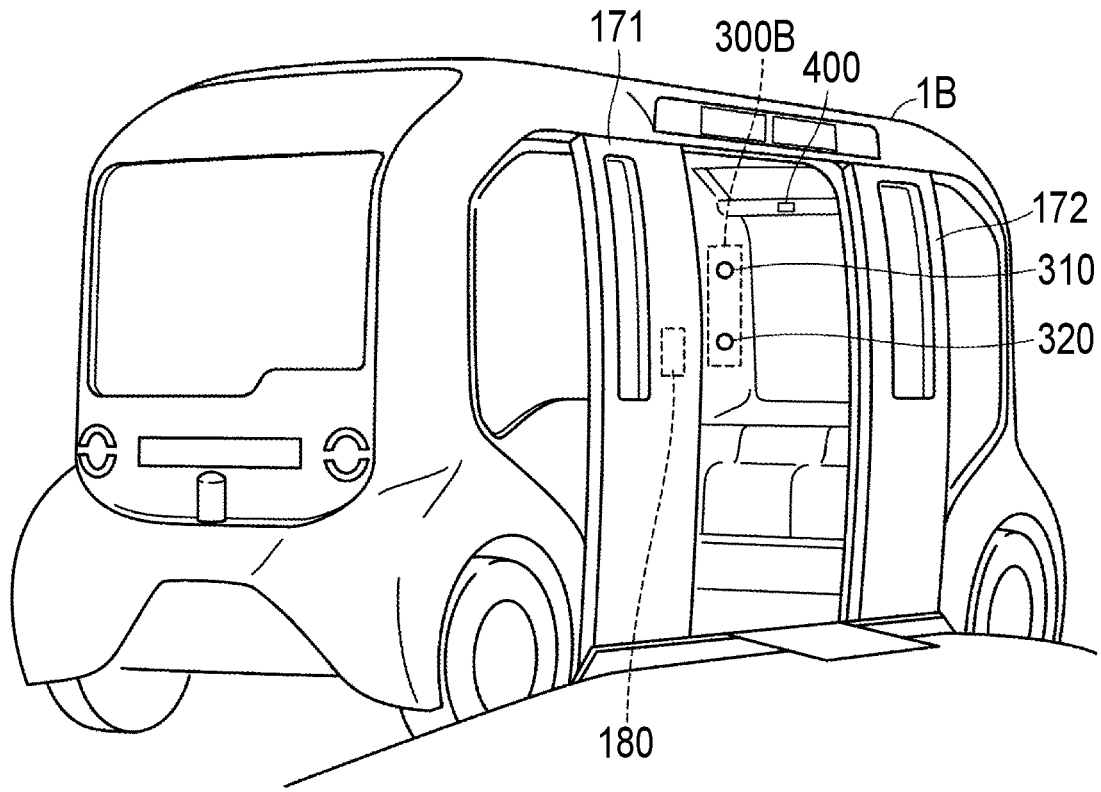
FIG. 12 is a diagram for describing a configuration of a second vehicle including the signal transmission device.

FIG. 12 is a diagram for describing a configuration of a vehicle 1B (second vehicle) including the signal transmission device. Since the configuration of the vehicle 1B is basically the same as the configuration of the vehicle 1 according to the embodiment described above, a difference will be mainly described below, and the description of common parts will be omitted.

With reference to FIG. 12, the vehicle 1B includes a signal transmission device 300B and the camera 400. Specifically, the signal transmission device 300B includes a first button 310 and a second button 320. Each of the first button 310 and the second button 320 is a push button that can be operated by the user and is fixed to an inner wall of the vehicle 1B. An explanation of the first button 310 (for example, "emergency stop when the abnormality occurs") may be described near the first button 310. An explanation of the second button 320 (for example, "call when the abnormality occurs") may be described near the second button 320. The signal transmission device 300B includes a built-in computer (not shown). The computer of the signal transmission device 300B is configured to monitor a state (operation/non-operation) of each of the first button 310 and the second button 320. A configuration of the camera 400 of the vehicle 1B corresponds to a configuration of the camera 400 of the vehicle 1A.

The signal transmission device 300B (more specifically, the computer) may executes a series of processing shown in FIG. 13 described below in a case where the user gets on the vehicle 1B during autonomous driving in the unmanned state (for example, in a case where the user authentication at the time of getting on the vehicle is successful). FIG. 13 is a flowchart showing processing executed by the signal transmission device 300B shown in FIG. 12.

With reference to FIGS. 1 to 4 together with FIG. 13, in S41, the signal transmission device 300B determines whether or not the first button 310 is pushed. In a case where the first button 310 is pushed (YES in S41), in S42, the signal transmission device 300B transmits the first abnormality signal for notifying the vehicle 1B of the abnormality to the server 500. Thereafter, the processing proceeds to S43. On the other hand, in a case where the first button 310 is not pushed (NO in S41), the processing proceeds to S43 without transmitting the first abnormality signal (S42).

In S43, the signal transmission device 300B determines whether or not the second button 320 is pushed. In a case where second button 320 is pushed (YES in S43), in S44, the signal transmission device 300B transmits the second abnormality signal for notifying the vehicle 1B of the abnormality to the server 500. Thereafter, the processing proceeds to S45. On the other hand, in a case where the second button 320 is not pushed (NO in S43), the processing proceeds to S45 without transmitting the second abnormality signal (S44).

In S45, the signal transmission device 300B determines whether or not the vehicle 1B is the unmanned state. The signal transmission device 300B may determine whether or not the vehicle 1B is the unmanned state based on the information from the server 500 (for example, the information indicating the user who is using the vehicle 1B). In addition, the signal transmission device 300B may determine whether or not the vehicle 1B is in the unmanned state based on the image captured by the camera 400. In a case where the person is present in the vehicle 1B (NO in S45), the processing returns to the first step (S41). In a case where the vehicle 1B is the unmanned state (YES in S45), the series of processing shown in FIG. 13 ends.

The server 500 may execute the processing shown in FIG. 14 instead of the processing shown in FIG. 7. FIG. 14 is a flowchart showing processing executed by the server 500 in response to the first and second abnormality signals (see FIG. 13). The processing shown in this flowchart is repeatedly executed by the server 500.

With reference to FIG. 14 together with FIGS. 1 to 4, in S51, the server 500 determines whether or not the first abnormality signal is received. In a case where the server 500 receives the first abnormality signal from the vehicle 1B (YES in S51), the server 500 executes the predetermined first processing in S52. Thereafter, the processing proceeds to S53. In one example, the first processing is the same processing as S26 (stop) in FIG. 7. It should be noted that the present disclosure is not limited to this, and the first processing can be set optionally.

On the other hand, in a case where the server 500 does not receive the first abnormality signal (NO in S51), the processing proceeds to S53 without executing the first processing (S52).

In S53, the server 500 determines whether or not the second abnormality signal is received. In a case where the server 500 receives the second abnormality signal from the vehicle 1B (YES in S53), the server 500 executes the predetermined second processing in S54. The second processing is processing different from the first processing. In one example, the second processing is the same processing as S27 (call) in FIG. 7. It should be noted that the present disclosure is not limited to this, and the second processing can be set optionally.

In a case where the processing of S54 is executed, the processing returns to the first step (S51). In addition, in a case where the server 500 does not receive the second abnormality signal (NO in S53), the processing returns to the first step (S51) without executing the second processing (S54).

In the vehicle management system and the vehicle management method shown in FIGS. 12 to 14, operating any of the first button 310 and the second button 320 corresponds to an example of a "predetermined operation (abnormality notification operation)" according to the present disclosure. The user can easily notify the server 500 of the abnormality of the vehicle 1B solely by pushing the first button 310 or the second button 320. The server 500 can execute appropriate processing in accordance with the kind of the abnormality (first abnormality signal or second abnormality signal). It should be noted that the number of buttons is not limited to two, and may be three or more.

In the embodiment described above, the passenger transportation service is provided by the autonomous driving vehicle. However, the service provided by the autonomous driving vehicle is not limited to the passenger transportation service and can be changed as appropriate. For example, a physical distribution service may be provided by the autonomous driving vehicle. In the physical distribution service, the worker for providing the service (for example, a worker who loads and unloads a package from the autonomous driving vehicle) can execute the abnormality notification operation.

The functions of the server 500 may be implemented on the cloud by cloud computing. In addition, the configuration of the vehicle is not limited to the configuration described in the embodiment described above (see FIGS. 1 and 2). The base vehicle may have an autonomous driving function without retrofitting. A level of autonomous driving may be fully autonomous driving (level 5) or conditional autonomous driving (for example, level 4).

The vehicle may include a solar panel or may have a flight function. The vehicle may include a charger for traveling charging or contactless charging. The vehicle is not limited to a passenger car, and may be a bus or a truck. The vehicle may be a multipurpose vehicle customized in accordance with the user's purpose of use. The vehicle may be a mobile store vehicle, an automated guided vehicle (AGV), or an agricultural machine. The vehicle may be a one-passenger small BEV (for example, a Micro Pallet).

The embodiment and each modification example described above may be carried out in any combination. The embodiment disclosed this time should be considered to be exemplary examples and not to be restrictive in all respects. The technical scope of the present disclosure is shown by the scope of claims rather than the description of the embodiment described above, and is intended to include all changes within the meaning and scope equivalent to the scope of claims.

What is claimed is:

1. A vehicle management system comprising:
a mobile terminal; and
a server that includes a processor configured to manage a vehicle,
wherein the mobile terminal is configured to transmit an abnormality signal for notifying of an abnormality of the vehicle to the processor in a case where a predetermined operation is executed for the mobile terminal in the vehicle during autonomous driving without presence of a manager, and wherein:
the mobile terminal is configured to receive a start operation;
the mobile terminal is configured to request input of a kind of the abnormality that has occurred in the vehicle in a case where the start operation is executed for the mobile terminal;
the mobile terminal is configured to transmit the abnormality signal indicating the kind of the abnormality to the processor in a case where the input of the kind of the abnormality is received;
the mobile terminal is configured to display a screen that displays a dirt button, a smell button, and an others button; and
the mobile terminal is configured to prompt a selection, via the screen, of the dirt button, the smell button, and the others button.

2. The vehicle management system according to claim 1, wherein the mobile terminal is mounted on the vehicle.

3. The vehicle management system according to claim 1, wherein the mobile terminal is configured not to receive the predetermined operation in a case where the vehicle is present outside a predetermined area.

4. The vehicle management system according to claim 1, wherein the mobile terminal is configured not to receive the predetermined operation outside a predetermined period.

5. The vehicle management system according to claim 1, wherein:
the processor is configured to stop autonomous driving of the vehicle in a case where the kind of the abnormality indicated by the abnormality signal is a predetermined first kind; and
the processor is configured to continue autonomous driving of the vehicle in a case where the kind of the abnormality indicated by the abnormality signal is a predetermined second kind.

6. The vehicle management system according to claim 1, wherein:
the mobile terminal has a call function; and
the processor is configured to start a call between a predetermined terminal and the mobile terminal in a case where the kind of the abnormality indicated by the abnormality signal is unknown.

7. The vehicle management system according to claim 1, wherein:
the mobile terminal includes a first button and a second button;
the mobile terminal is configured to transmit a first abnormality signal for notifying of the abnormality of the vehicle to the processor in a case where the first button is operated in the vehicle during autonomous driving without the presence of the manager;
the mobile terminal is configured to transmit a second abnormality signal for notifying of the abnormality of the vehicle to the processor in a case where the second button is operated in the vehicle during autonomous driving without the presence of the manager; and
the processor is configured to execute predetermined first processing in a case where the first abnormality signal is received, and execute predetermined second processing in a case where the second abnormality signal is received.

8. The vehicle management system according to claim 1, wherein the predetermined operation comprises an abnormality notification operation that includes operating an abnormality button and executing requested input.

9. The vehicle management system according to claim 1, wherein the abnormality comprises dirt, smell, or a kind other than dirt and smell.

10. The vehicle management system according to claim 9, wherein the mobile terminal is configured to:
prompt a user to input the kind of the abnormality including dirt;
receive input indicative of a location in a case where the abnormality includes dirt;
activate a camera; and
capture an image of the location via the camera.

11. The vehicle management system according to claim 9, wherein the mobile terminal is configured to:
prompt a user to input the kind of the abnormality including the smell; and
receive input indicative of the kind of smell.

12. The vehicle management system according to claim 1, wherein the mobile terminal is configured to display first information including a periphery map of the vehicle and display second information including a sightseeing spot in the periphery of the vehicle.

13. The vehicle management system according to claim 1, wherein the requested input of the kind of the abnormality is that which is felt by a user.

14. A vehicle management method comprising:
determining whether or not a predetermined operation is executed for a mobile terminal in a vehicle during autonomous driving without presence of a manager;
transmitting an abnormality signal for notifying of an abnormality of the vehicle to a server including a processor configured to manage the vehicle via the mobile terminal in a case where the predetermined operation is executed for the mobile terminal;
receiving a start operation;
requesting input of a kind of the abnormality that has occurred in the vehicle in a case where the start operation is executed for the mobile terminal; and
transmitting the abnormality signal indicating the kind of the abnormality to the processor in a case where the input of the kind of the abnormality is received;
displaying a screen, on the mobile terminal, that displays a dirt button, a smell button, and an others button; and
prompting a selection, via the screen on the mobile terminal, of the dirt button, the smell button, and the others button.

15. The vehicle management method according to claim 14, wherein the determination of whether or not the predetermined operation is executed is made solely in a case where the vehicle is during autonomous driving without the presence of the manager within a predetermined area.

16. The vehicle management method according to claim 14, wherein the determination of whether or not the predetermined operation is executed is made solely in a case where the vehicle is during autonomous driving without the presence of the manager within a predetermined period.

17. The vehicle management method according to claim 14, wherein the mobile terminal is mounted on the vehicle.

18. A vehicle management system comprising:
   a mobile terminal; and
   a server that includes a processor configured to manage a vehicle,
   wherein the mobile terminal is configured to transmit an abnormality signal for notifying of an abnormality of the vehicle to the processor in a case where a predetermined operation is executed for the mobile terminal in the vehicle during autonomous driving without presence of a manager, and wherein:
      the mobile terminal is configured to receive a start operation;
      the mobile terminal is configured to request input of a kind of the abnormality that has occurred in the vehicle in a case where the start operation is executed for the mobile terminal;
      the mobile terminal is configured to transmit the abnormality signal indicating the kind of the abnormality to the processor in a case where the input of the kind of the abnormality is received; and
   wherein the mobile terminal is configured:
      display a first screen that includes a plurality of buttons, at least one of the plurality of buttons corresponding to the predetermined operation that includes an abnormality button; and
      display, in response to receiving a selection of the predetermined operation that includes the abnormality button, a second screen that displays a dirt button, a smell button, and an others button.

* * * * *